United States Patent
Kibayashi et al.

(10) Patent No.: US 8,480,202 B2
(45) Date of Patent: Jul. 9, 2013

(54) ECCENTRICITY AMOUNT ESTIMATION DEVICE, ROTATION VELOCITY CONTROL DEVICE, IMAGE FORMING APPARATUS, AND COMPUTER READABLE STORAGE MEDIUM

(75) Inventors: Susumu Kibayashi, Kanagawa (JP); Hiroaki Satoh, Kanagawa (JP); Toru Nishida, Kanagawa (JP); Takeshi Zengo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 462 days.

(21) Appl. No.: 12/703,310

(22) Filed: Feb. 10, 2010

(65) Prior Publication Data

US 2011/0018916 A1 Jan. 27, 2011

(30) Foreign Application Priority Data

Jul. 21, 2009 (JP) ................................ 2009-170347

(51) Int. Cl.
*B41J 29/38* (2006.01)

(52) U.S. Cl.
USPC ............................................ 347/16; 347/104

(58) Field of Classification Search
USPC .............................................. 347/16, 19, 104
See application file for complete search history.

(56) References Cited

U.S. PATENT DOCUMENTS

| | | | |
|---|---|---|---|
| 5,272,335 A | 12/1993 | Nakaho | |
| 7,733,041 B2 * | 6/2010 | Ishizaki | 318/254.1 |
| 2005/0219293 A1 * | 10/2005 | Kachi | 347/14 |
| 2007/0122194 A1 * | 5/2007 | Imai | 399/167 |
| 2008/0159784 A1 * | 7/2008 | Seto | 399/167 |

FOREIGN PATENT DOCUMENTS

| | | |
|---|---|---|
| JP | 5-018783 | 1/1993 |
| JP | 6-018285 | 1/1994 |
| JP | 7-140844 | 6/1995 |
| JP | 2002-257595 | 9/2002 |
| JP | 2003-130688 | 5/2003 |
| JP | 2004-219362 | 8/2004 |
| JP | 2007-183255 | 7/2007 |
| JP | 2008-23943 | 2/2008 |
| JP | 2008-132707 | 6/2008 |

OTHER PUBLICATIONS

Office Action issued Apr. 2, 2013 in Japanese patent application No. 2009-170347 and English translation.
English Language translation of JP 2007-183255.
English Language translation of JP 2008-132707.
English Language translation of JP 2008-23943.

* cited by examiner

*Primary Examiner* — Julian Huffman
*Assistant Examiner* — Sharon A Polk
(74) *Attorney, Agent, or Firm* — Fildes & Outland, P.C.

(57) ABSTRACT

There is provided an eccentricity amount estimation device, including: a rotation body provided with plural detected portions disposed along the rotation direction at predetermined rotation angle intervals, each of the plural detected portions being formed such that from an outer peripheral end towards an inner peripheral end a width of the detected portion at a position at the peripheral inside is the same as or greater than the width at a position at the peripheral outside; a generating section that generates a pulse signal according to passing of each of the plural detected portions accompanying rotation of the rotation body; and an estimation section that estimates a physical quantity corresponding to an eccentricity amount of the rotation body, based on a high level side pulse width and a low level side pulse width within one period of the pulse signal generated by the generating section.

9 Claims, 16 Drawing Sheets

ECCENTRICITY AMOUNT ESTIMATION DEVICE, ROTATION VELOCITY CONTROL DEVICE, IMAGE FORMING APPARATUS, AND COMPUTER READABLE STORAGE MEDIUM

CROSS-REFERENCE TO RELATED APPLICATION

This application claims priority under 35 USC 119 from Japanese Patent Application No. 2009-170347 filed on Jul. 21, 2009.

BACKGROUND

Technical Field

The present invention relates to an eccentricity amount estimation device, a rotation velocity control device, an image forming apparatus, and a computer readable storage medium.

SUMMARY

According to aspect of the invention, there is provided an eccentricity amount estimation device, including:

a rotation body provided with plural detected portions disposed along the rotation direction at predetermined rotation angle intervals, each of the plural detected portions being formed such that from an outer peripheral end towards an inner peripheral end a width of the detected portion at a position at the peripheral inside is the same as or greater than the width at a position at the peripheral outside;

a generating section that generates a pulse signal according to passing of each of the plural detected portions accompanying rotation of the rotation body; and an estimation section that estimates a physical quantity corresponding to an eccentricity amount of the rotation body, based on a high level side pulse width and a low level side pulse width within one period of the pulse signal generated by the generating section.

BRIEF DESCRIPTION OF THE DRAWINGS

Exemplary embodiments of the present invention will be described in detail based on the following figures, wherein.

DETAILED DESCRIPTION

A detailed explanation is given below of an example of an exemplary embodiment of the present invention, with reference to the drawings.

First Exemplary Embodiment

Figure 1:
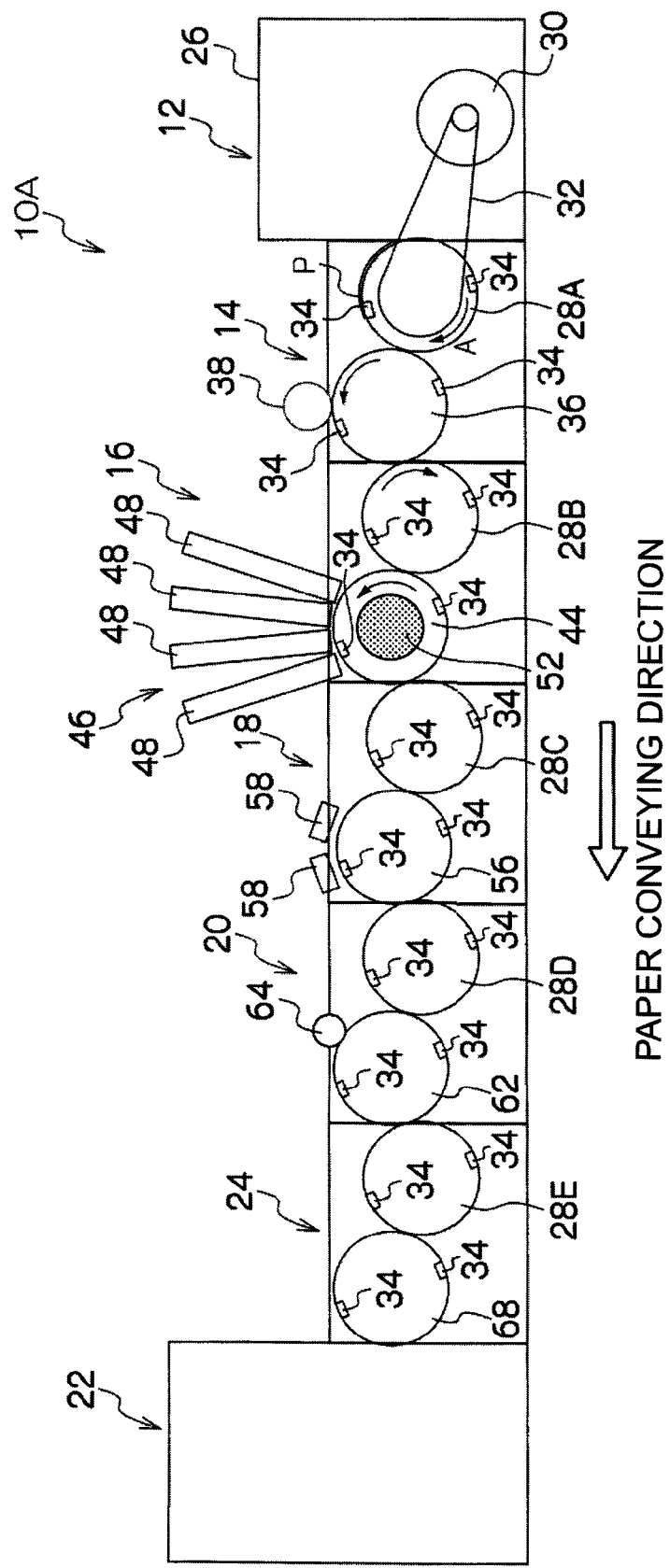
FIG. 1 is a side view showing a configuration of an image forming apparatus according to first to fourth exemplary embodiments.

FIG. 1 is a side view showing a configuration of an image forming apparatus 10A according to a first exemplary embodiment. As shown in FIG. 1, a paper feeder conveying section 12 is provided in the image forming apparatus 10A, for feeding and conveying recording paper P, serving as a recording medium. At the recording paper P conveying direction downstream side of the paper feeder conveying section 12 are provided, in the following sequence along the conveying direction: a processing liquid application section 14 that applies to the recording face (surface) of the recording paper P a processing liquid that reacts with ink, in order to aggregate coloring matter (for example pigment) and promote separation of coloring matter and solvent; an image forming section 16 that forms an image on the recording face of the recording paper P; a drying section 18 that dries the image formed on the recording face; an image fixing section 20 that fixes the dried image onto the recording paper P; and a discharge conveying section 24 that conveys the image-fixed recording paper P to a discharge section 22.

The paper feeder conveying section 12 is equipped with a storage section 26 in which recording paper P is stored. A motor 30 is provided to the storage section 26. A paper feeding device (not shown in the figures) is further provided to the storage section 26, and the recording paper P is fed out by the paper feeding device from the storage section 26 towards the processing liquid application section 14.

The processing liquid application section 14 is equipped with an intermediate conveying drum 28A and a processing liquid application drum 36. The intermediate conveying drum 28A is rotatably disposed in a region sandwiched between the storage section 26 and the processing liquid application drum 36, and a belt 32 is entrained around a rotation shaft of the intermediate conveying drum 28A and a rotation shaft of the motor 30. Consequently, rotation driving force of the motor 30 is transmitted to the intermediate conveying drum 28A via the belt 32, thereby rotating the intermediate conveying drum 28A in the direction of arrow A.

Retaining members 34 are provided to the intermediate conveying drum 28A, with the retaining members 34 nipping leading ends of the recording paper P and retaining the recording paper P. Consequently, the recording paper P fed out from the storage section 26 towards the processing liquid application section 14 is retained on the outer peripheral face of the intermediate conveying drum 28A by the retaining members 34, and conveyed towards the processing liquid application drum 36 by rotation of the intermediate conveying drum 28A.

Note that, similar to provision to the intermediate conveying drum 28A, retaining members 34 are also provided to intermediate conveying drums 28B to 28E, the processing liquid application drum 36, an image forming drum 44, an ink drying drum 56, an image fixing drum 62, and a discharge conveying drum 68, these being described below. The recording paper P is passed across from a drum on the upstream side to a drum on the downstream side by means of these retaining members 34.

The rotation shaft of the processing liquid application drum 36 is connected to the rotation shaft of the intermediate conveying drum 28A by gears (not shown in the figures), receives rotational force from the intermediate conveying drum 28A, and rotates.

The recording paper P conveyed by the intermediate conveying drum 28A is passed across to the processing liquid application drum 36 via the retaining members 34 of the processing liquid application drum 36, and conveyed in a retained state on the outer peripheral face of the processing liquid application drum 36.

A processing liquid application roller 38 is disposed above the processing liquid application drum 36 in a state of contact with the outer peripheral face of the processing liquid application drum 36. Processing liquid is applied by the processing liquid application roller 38 to the recording face of the recording paper P disposed on the outer peripheral face of the processing liquid application drum 36.

The recording paper P, to which the processing liquid has been applied by the processing liquid application section 14, is conveyed towards the image forming section 16 by rotation of the processing liquid application drum 36.

The image forming section 16 is equipped with the intermediate conveying drum 28B and the image forming drum 44. The rotation shaft of the intermediate conveying drum 28A is connected to the rotation shaft of the processing liquid application drum 36 by gears (not shown in the figures), receives rotational force from the processing liquid application drum 36, and rotates.

The recording paper P, conveyed by the processing liquid application drum 36, is passed across to the intermediate conveying drum 28B via the retaining members 34 of the intermediate conveying drum 28B of the image forming section 16, and is conveyed in a retained state on the outer peripheral face of the intermediate conveying drum 28B.

The rotation shaft of the image forming drum 44, serving as an image conveying section, is connected to the rotation shaft of the intermediate conveying drum 28B by gears (not shown in the figures), receives rotational force from the intermediate conveying drum 28B, and rotates.

The recording paper P, conveyed by the intermediate conveying drum 28B, is passed across to the image forming drum 44 via the retaining members 34 of the image forming drum 44, and conveyed in a retained state on the outer peripheral face of the image forming drum 44.

A head unit 46 is disposed above the image forming drum 44, in close proximity to the outer peripheral face of the image forming drum 44. The head unit 46 is provided with four inkjet recording heads 48, serving as recording sections, corresponding to each of four colors, yellow (Y), magenta (M), cyan (C), and black (K). The inkjet recording heads 48 are arrayed along the peripheral direction of the image forming drum 44, so as to form an image by ejecting ink droplets, synchronized with a clock signal of a CPU, from nozzles 48a, described below, such that the image is superimposed on a processing liquid layer formed on the recording face of the recording paper P by the processing liquid application section 14.

The image forming drum 44 is equipped with a rotary encoder 52, described in detail below. Accompanying rotation of the image forming drum 44, the rotary encoder 52 generates a pulse signal for detecting a predetermined rotation reference position of the image forming drum 44, and a pulse signal for detecting the angle of rotation from the predetermined rotation reference position of the image forming drum 44.

The recording paper P, formed with an image on the recording face by the image forming section 16, is conveyed towards the drying section 18 by rotation of the image forming drum 44.

The drying section 18 is equipped with the intermediate conveying drum 28C and the ink drying drum 56. The rotation shaft of the intermediate conveying drum 28C is connected to the rotation shaft of the image forming drum 44 through gears (not shown in the figures), receives rotational force from the image forming drum 44, and rotates.

The recording paper P conveyed by the image forming drum 44 is passed across to the intermediate conveying drum 28C via the retaining members 34 of the intermediate conveying drum 28C, and conveyed in a retained state on the outer peripheral face of the intermediate conveying drum 28C.

The rotation shaft of the ink drying drum 56 is connected to the rotation shaft of the intermediate conveying drum 28C through gears (not shown in the figures), receives rotational force from the intermediate conveying drum 28C, and rotates.

The recording paper P, conveyed by the intermediate conveying drum 28C, is passed across to the ink drying drum 56 by the retaining member 34 of the ink drying drum 56, and is conveyed in a retained state on the outer peripheral face of the ink drying drum 56.

A warm air heater 58 is disposed above the ink drying drum 56, in close proximity to the outer peripheral face of the ink drying drum 56. Excess solvent in the image formed on the recording paper P is removed by warm air from the warm air heater 58. The recording paper P, whose image on the recording face has been dried by the drying section 18, is conveyed towards the image fixing section 20 by rotation of the ink drying drum 56.

The image fixing section 20 is equipped with the intermediate conveying drum 28D and the image fixing drum 62. The rotation shaft of the intermediate conveying drum 28D is connected to the rotation shaft of the ink drying drum 56 through gears (not shown in the figures), receives rotational force from the ink drying drum 56, and rotates.

The recording paper P conveyed by the ink drying drum 56 is passed across to the intermediate conveying drum 28D via the retaining members 34 of the intermediate conveying drum 28D, and conveyed in a retained state on the outer peripheral face of the intermediate conveying drum 28D.

The rotation shaft of the image fixing drum 62 is connected to the rotation shaft of the intermediate conveying drum 28D through gears (not shown in the figures), receives rotational force from the intermediate conveying drum 28D, and rotates.

The recording paper P, conveyed by the intermediate conveying drum 28D, is passed across to the image fixing drum 62 via the retaining members 34 of the image fixing drum 62, and conveyed in a retained state on the outer peripheral face of the image fixing drum 62.

A fixing roller 64 with an internal heater is disposed above the image fixing drum 62, in a state of pressing contact with the outer peripheral face of the image fixing drum 62. The recording paper P that is retained on the outer peripheral face of the image fixing drum 62 is nipped between the outer peripheral face of the image fixing drum 62 and the outer peripheral face of the fixing roller 64. The coloring matter of the image formed on the recording face of the recording paper P is fused to the recording paper P by being in a state of pressing contact with the outer peripheral face of the fixing roller 64 and heating with the above heater, thereby fixing the image onto the recording paper P. The recording paper P, whose image has been fixed by the image fixing section 20, is conveyed towards the discharge conveying section 24 by rotation of the image fixing drum 62.

The discharge conveying section 24 is equipped with the intermediate conveying drum 28E and the discharge conveying drum 68. The rotation shaft of the intermediate conveying drum 28E is connected to the rotation shaft of the image fixing drum 62 through gears (not shown in the figures), receives rotational force from the image fixing drum 62, and rotates.

The recording paper P, conveyed by the image fixing drum 62, is passed across to the intermediate conveying drum 28E via the retaining members 34 of the intermediate conveying drum 28E, and is conveyed in a retained state on the outer peripheral face of the intermediate conveying drum 28E.

The rotation shaft of the discharge conveying drum 68 is connected to the rotation shaft of the intermediate conveying drum 28E through gears (not shown in the figures), receives rotational force from the intermediate conveying drum 28E, and rotates.

The recording paper P, conveyed by the intermediate conveying drum 28E, is passed across to the discharge conveying drum 68 via the retaining members 34 of the discharge conveying drum 68, and is conveyed towards the discharge section 22 in a retained state on the outer peripheral face of the discharge conveying drum 68.

Figure 2:
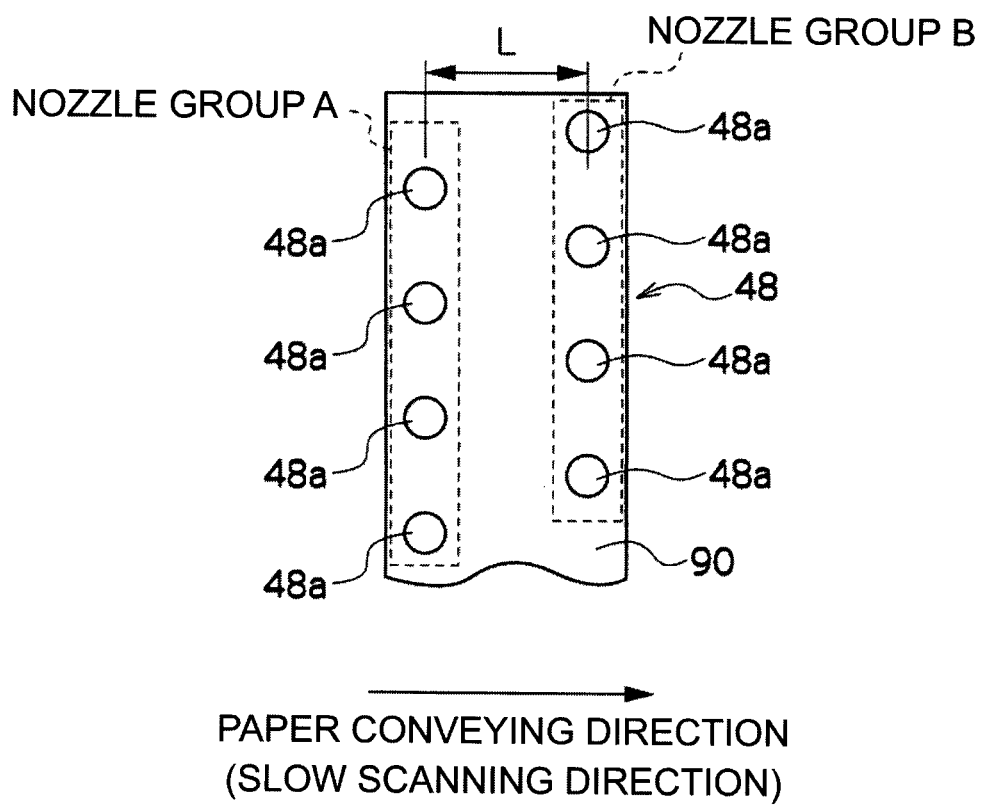
FIG. 2 is a face-on view showing a structure of an ink ejection aperture face side of an inkjet head according to an exemplary embodiment.

FIG. 2 is a face-on view of one of the inkjet recording heads 48 according to the first exemplary embodiment, showing the structure of the side of an ink ejection hole face of the inkjet recording heads 48. As shown in FIG. 2, in the inkjet recording head 48, plural of the nozzles 48a are formed to a face 90 that faces the outer peripheral face of the image forming drum 44, with each of the nozzles 48a serving as image forming element that ejects ink droplets. Each of the inkjet recording heads 48 is a structure in which the nozzles 48a are disposed in a two-dimensional pattern (in the present first exemplary embodiment a staggered matrix shape) in which the plural nozzles 48a do not overlap with each other along the conveying direction (slow scanning direction) of the recording paper P by the image forming drum 44. A higher density is thereby achieved in the effective nozzle separation projected (projected nozzle pitch) by placing the nozzles 48a in rows along the head length direction (the direction perpendicular to the conveying direction of the recording paper P by the image forming drum 44 (referred to below simply as "conveying direction")) in this manner.

Note that in the inkjet recording heads 48 according to the present first exemplary embodiment, the plural nozzles 48a are disposed at predetermined intervals, arrayed in a nozzle group A positioned at the upstream side in the conveying direction, and a nozzle group B, positioned at the conveying direction downstream side such that each of the nozzles 48a of the nozzle group B is positioned between nozzles 48a of the nozzle group A.

Figure 3:
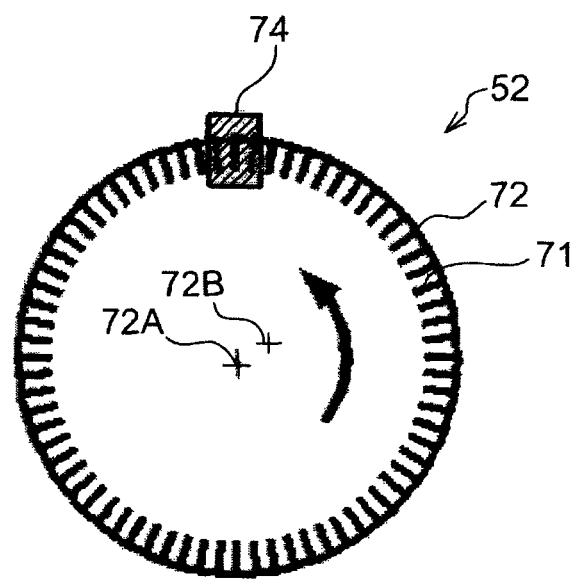
FIG. 3 is a configuration diagram showing a configuration of a rotary encoder according to an exemplary embodiment.

FIG. 3 is a configuration diagram showing a configuration of the rotary encoder 52. As shown in FIG. 3, the rotary encoder 52 is configured including: a circular plate-shaped code wheel 72, serving as a rotation body, fixed to the image forming drum 44 such that its center portion is positioned at the center portion of the image forming drum 44, the code wheel 72 being formed with plural slits 71, serving as detected portions, disposed at substantially even intervals along the peripheral direction of the code wheel 72; and a transmission photo-sensor 74, serving as a generating section that detect the slits 71 and generates a pulse signal. The transmission photo-sensor 74 is fixed to a casing (not shown in the figures) of the image forming apparatus 10A so as to correspond with a predetermined position on the outer peripheral portion of the code wheel 72, and is configured such that a light emitting element and a light receiving element are disposed facing each other with the code wheel 72 interposed therebetween.

Figure 4:
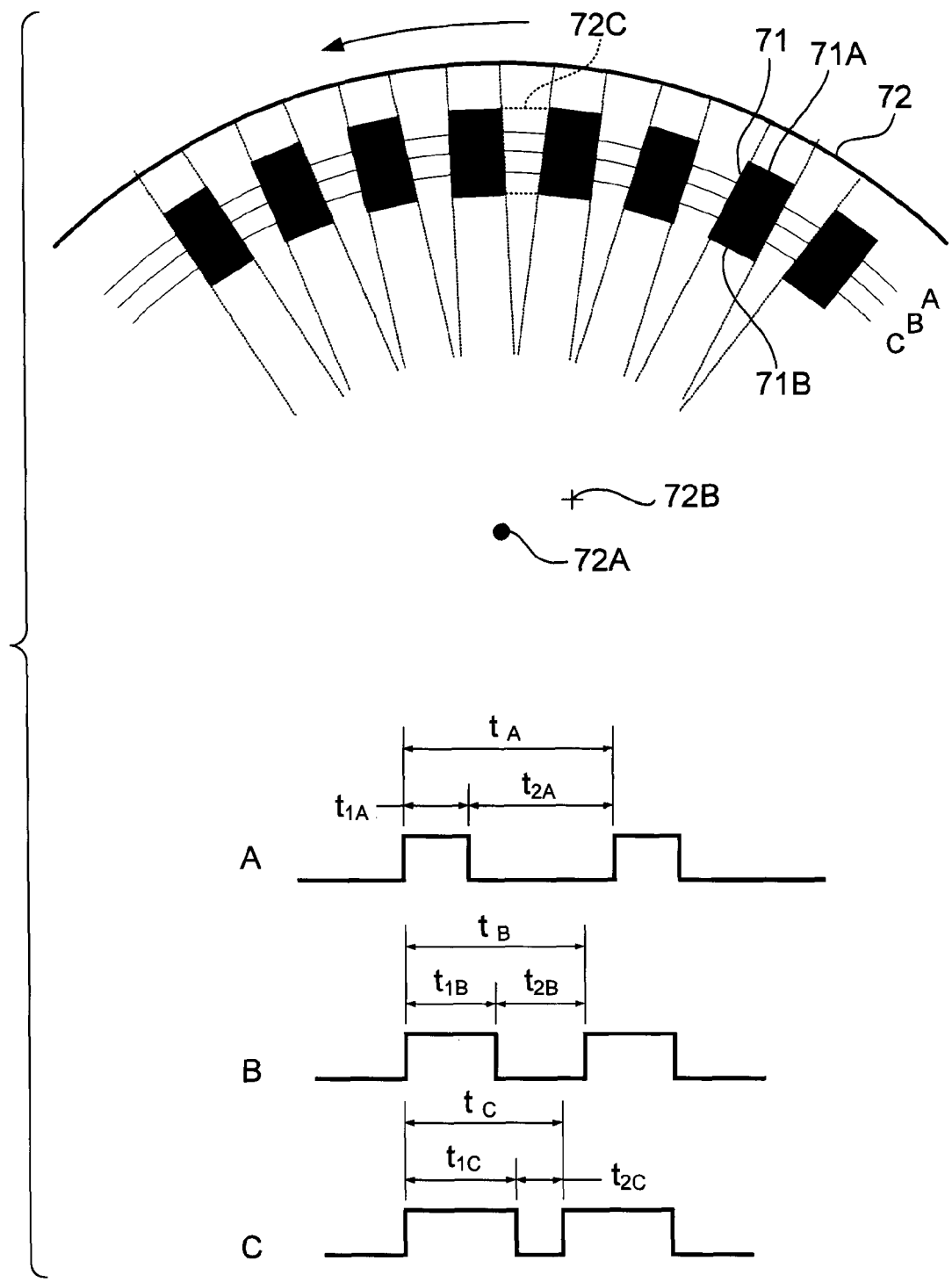
FIG. 4 is a diagram showing a configuration of a code wheel included in a rotary encoder according to an exemplary embodiment, and waveforms of pulse signals obtained by employing the code wheel.

FIG. 4 shows an example of a configuration of the code wheel 72 according to the present first exemplary embodiment. As shown in FIG. 4, each of the plural slits 71 is formed in the code wheel 72 in a rectangular shape of a given width extending from a base end 71A at the outer peripheral face side towards a leading end 71B at a center 72A side. Namely, the slits 71 are formed such that their widths do not change from the base end 71A to the leading end 71B. The separation between adjacent of the slits 71 formed in the code wheel 72 corresponds to a reference rotation angle $\Theta_0$ of the code wheel 72 (for example 1.257 milliradians), with the plural rectangular individual slits 71 formed at intervals of the reference rotation angle $\Theta_0$ around the entire circumference of the code wheel 72. A light blocking portion 72C is formed, as an isosceles trapezoid, positioned with its short length side at the center side and its longer length side at the outer peripheral side, in each of the regions between one of the slits 71 and another of the slits 71.

Note that in the present first exemplary embodiment, any misalignment of the center 72A of the code wheel 72 attached to the image forming drum 44, with respect to the axial center 72B of the rotation shaft that rotates the image forming drum 44 due to transmitted rotation driving force of the motor 30, is referred to as "code wheel 72 eccentricity", and any misalignment of the image forming drum 44 with respect to the axial center 72B of the rotation body is referred to as "image forming drum 44 eccentricity".

In addition, while not shown in the figures, a reference slit is provided in the code wheel 72 further towards the central portion of the code wheel 72 than the plural slits 71, for detecting the rotation reference position of the code wheel 72 that is equivalent to a predetermined rotation reference position of the image forming drum 44. A transmission photo-sensor, separate to the transmission photo-sensor 74, is also provided to the casing of the image forming apparatus 10A, in order to detect this reference slit.

Figure 5:
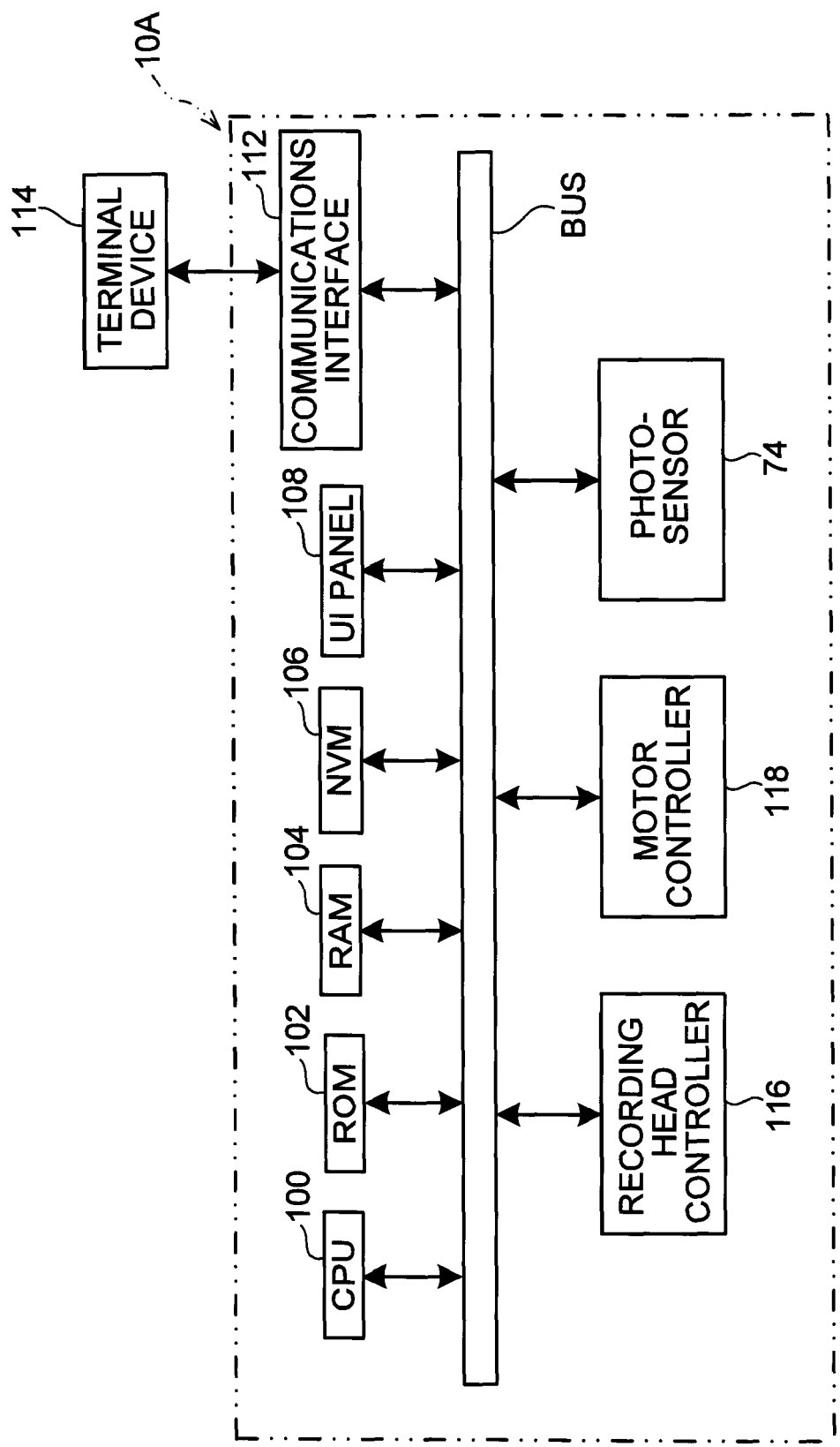
FIG. 5 is a block diagram showing relevant parts of a configuration of an electrical system of an image forming apparatus according to the first to the fourth exemplary embodiments.

FIG. 5 is a block diagram showing relevant parts in a configuration of the electrical system of the image forming apparatus 10A according to the present first exemplary embodiment.

As shown in FIG. 5, the image forming apparatus 10A is configured including: a Central Processor Unit (CPU) 100, a Read Only Memory (ROM) 102, a Random Access Memory (RAM) 104, a Non Volatile Memory (NVM) 106, a User Interface (UI) panel 108, and a communications interface 112. In the present first exemplary embodiment, the device configured by the rotary encoder 52, the CPU 100, the ROM 102, and the RAM 104 corresponds to the eccentricity amount estimation device that estimates a physical amount corresponding to the eccentricity amount of the code wheel 72.

The CPU 100 controls operation of the image forming apparatus 10A overall. The ROM 102 is a storage medium pre-stored with, for example, a control program for controlling operation of the image forming apparatus 10A, an image forming processing program, described below, various parameters and the like. The RAM 104 is a storage medium employed, for example, as a work area when executing various programs, and the like. The NVM 106 is a non-volatile storage medium that stores, for example, various data that needs to be retained even when the device power switch is switched off.

The UI panel 108 is configured, for example, from a touch panel display or the like, having a transmission touch panel superimposed on a display. Various information is displayed on the display face of the display, and desired data and instructions are input by a user touching the touch panel.

The communications interface 112 is connected to a terminal device 114, such as, for example, a personal computer. The communications interface 112 both receives various data from the terminal device 114 (for example image data expressing an image for forming on the recording paper P), and transmits various data to the terminal device 114 (for example data expressing an operation state of the image forming apparatus 10A).

The CPU 100, the ROM 102, the RAM 104, the NVM 106, the UI panel 108 and the communications interface 112 are mutually connected together by a bus BUS, such as a system bus. Consequently, the CPU 100 accesses the ROM 102, the RAM 104 and the NVM 106, displays various data on the UI panel 108, ascertains the content of operation instructions by a user to the UI panel 108, receives various data from the terminal device 114 via the communications interface 112, and transmits various types of data to the terminal device 114 via the communications interface 112.

The image forming apparatus 10A is also equipped with a recording head controller 116 and a motor controller 118.

The recording head controller 116 controls the operation of the inkjet recording heads 48 according to instructions from the CPU 100. The motor controller 118 controls the operation of the motor 30.

The recording head controller 116 and the motor controller 118 are also both connected to the BUS. Consequently, the CPU 100 controls the operation of the recording head controller 116 and the motor controller 118.

The previously mentioned transmission photo-sensor 74 is also connected to the BUS. Consequently, the CPU 100 controls the operation of the transmission photo-sensor 74, ascertains the operational state (for example the pulse signal generation state) of the transmission photo-sensor 74, and receives the pulse signals generated by the transmission photo-sensor 74.

Explanation follows of operation of the image forming apparatus 10A according to the present first exemplary embodiment.

The image forming apparatus 10A according to the present first exemplary embodiment feeds out the recording paper P from the storage section 26 towards the intermediate conveying drum 28A using the paper feeding device. The recording paper P is conveyed towards the image forming drum 44 via the intermediate conveying drum 28A, the processing liquid application drum 36 and the intermediate conveying drum 28B, and then retained on the outer peripheral face of the image forming drum 44. Based on image data, ink droplets are then ejected from the nozzles 48a of the inkjet recording heads 48, onto the recording paper P retained on the image forming drum 44. An image expressed by the above image data is thereby formed on the recording paper P.

Figure 6:
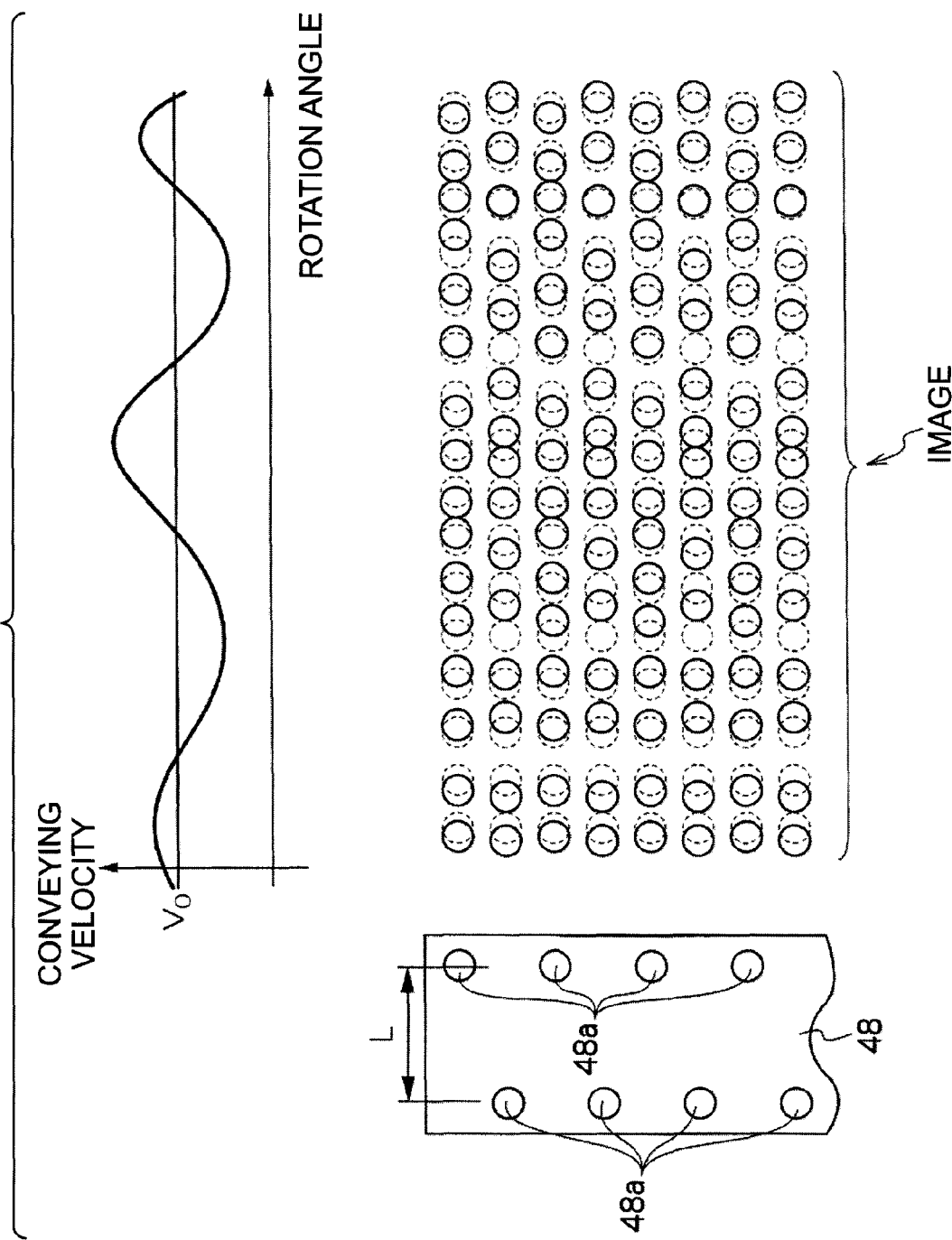
FIG. 6 is an schematic diagram showing an example of fluctuations in conveying velocity accompanying an increase in the rotation angle of an image forming drum in an image forming apparatus according to the first to the fourth exemplary embodiments, and showing an example of a state of change in the impact positions of ink droplets due to the fluctuations.

By the way, the conveying velocity of the recording paper P retained on the outer peripheral face of the image forming drum 44 fluctuates, due to, for example, image forming drum 44 eccentricity, an example thereof is shown in a graph of FIG. 6. In the graph of FIG. 6 the vertical axis represents the conveying velocity of the recording paper P on the image forming drum 44, and the horizontal axis shows the angle of rotation from the predetermined rotation reference position of the image forming drum 44. The impact positions of ink dots, serving as configuration units of an image, are shown as continuous circles aligned with the graph of FIG. 6. The circles shown with broken lines show an example of the impact positions of ink droplets ejected from each of the nozzles 48a in a case where there is no image forming drum 44 eccentricity present (when the conveying velocity of the recording paper P is velocity $V_0$). The circles shown with solid lines in the image of FIG. 6 show an example of the impact positions of ink droplets ejected from each of the nozzles 48a in a case where image forming drum 44 eccentricity is present.

In a state like this, where the conveying velocity of the recording paper P on the image forming drum 44 fluctuates, the clock signal, for synchronizing to the pulse signal generated by the rotary encoder 52, is output to the inkjet recording heads 48. When ink droplets ejected from the nozzles 48a by being synchronized to such a clock signal for the inkjet recording heads 48, the image formed by the ink droplets is distorted, as in the example shown in FIG. 6.

Figure 7:
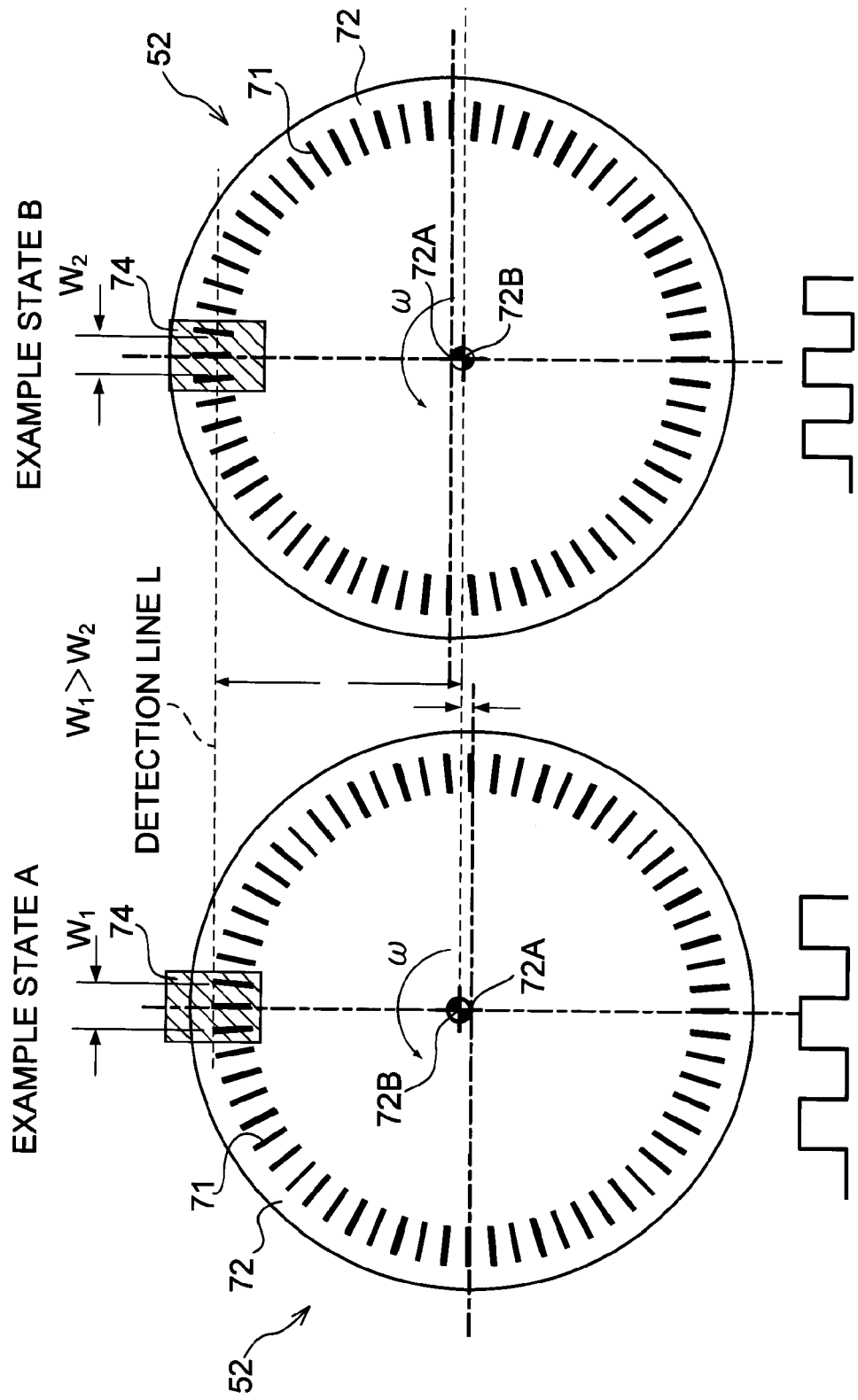
FIG. 7 is a face-on view of a rotary encoder according to the first exemplary embodiment.

FIG. 7 is a face-on view of the rotary encoder 52, showing: an example state A of the rotary encoder 52 when the center 72A of the code wheel 72 is in a state positioned to the side further away from the transmission photo-sensor 74 than the rotation shaft axial center 72B when the code wheel 72 is rotating at an angular velocity ω anticlockwise; and an example state B of the rotary encoder 52 when the center 72A of the code wheel 72 is in a state positioned to the side nearer to the transmission photo-sensor 74 than the rotation shaft axial center 72B when the code wheel 72 is rotating at an angular velocity ω anticlockwise. As shown in FIG. 7, depending on the center position of the code wheel 72 for transmission photo-sensor 74, the interval between the slits 71 on the detection line L, showing the detection position with the transmission photo-sensor 74, is different in for the rotary encoder 52 when the center 72A of the code wheel 72 is positioned to the side further away from the transmission photo-sensor 74 than the rotation shaft axial center 72B to the rotary encoder 52 when the center 72A of the code wheel 72 is in a state positioned to the side nearer to the transmission photo-sensor 74 than the rotation shaft axial center 72B. Namely, since the linear velocity differs according to distance from the center 72A of the code wheel 72, the detected interval differs according to the distance from the center 72A of the code wheel 72 up to the detection position of the transmission photo-sensor 74. For example, the detection interval $W_1$ with the transmission photo-sensor 74 when the position of the center 72A of the code wheel 72 is positioned to the side further away from the transmission photo-sensor 74 than the rotation shaft axial center 72B, is longer than the detection interval $W_2$ with the transmission photo-sensor 74 when the center 72A of the code wheel 72 is positioned to the side nearer to the transmission photo-sensor 74 than the rotation shaft axial center 72B. Consequently, the period of the clock signal input to the inkjet recording heads 48 also fluctuates, since when the detection interval with the transmission photo-sensor 74 gets longer, then the period of the pulse signal generated from the transmission photo-sensor 74 gets longer accordingly, and since when the detection interval with the transmission photo-sensor 74 gets shorter, then the period of the pulse signal generated from the transmission photo-sensor 74 gets shorter accordingly.

Figure 8:
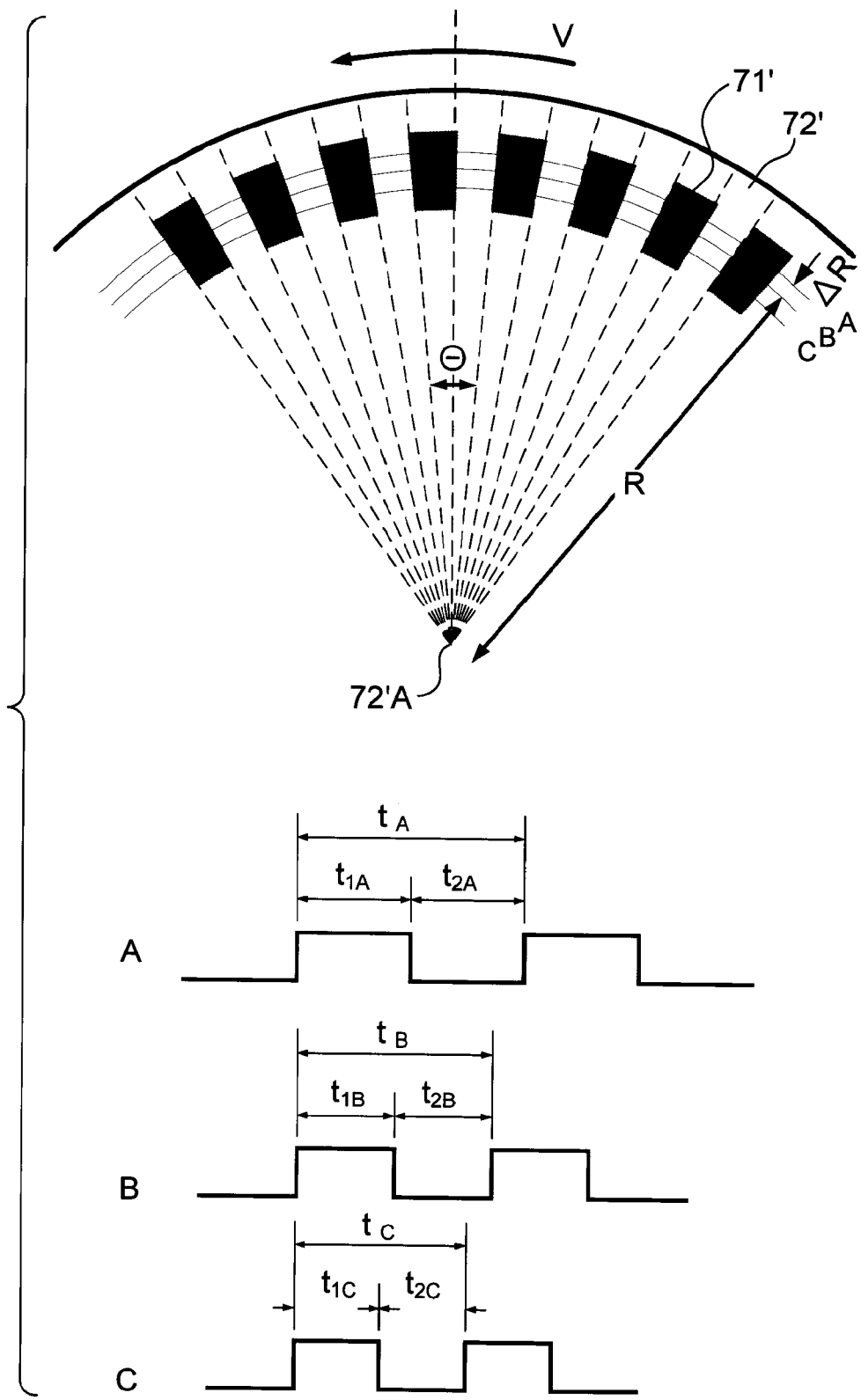
FIG. 8 is a diagram showing, as a comparative example, a configuration of a code wheel, and waveforms of pulse signals obtained by employing the code wheel.

FIG. 8 shows a code wheel 72', as a comparative example. As shown in FIG. 8, in the code wheel 72', plural slits 71' are disposed at substantially even intervals along the peripheral direction of the code wheel 72'. The slits 71' each extend outwards in a radial shape from a center 72'A so as to form substantially a fan shape, with the width of the slits 71' gradually getting wider on progression towards the peripheral direction outside from the center 72'A side of the code wheel 72'.

In the comparative example shown in FIG. 8, the interval between the slits 71' gets wider along with separation distance from the center. Namely, the detected interval by the transmission photo-sensor 74 of the slits 71' gets wider by the amount the linear velocity (=angular velocity×radius) is faster, and the detected interval by the transmission photo-sensor 74 of the slits 71' gets narrower by the amount the linear velocity is slower. Consequently, when the code wheel 72' rotates at a predetermined angular velocity at the center 72'A, the duty ratio of the pulse signal does not change even if the detection position is displaced in the radial direction.

For example, if $t_A$(="pulse width $t_{1A}$ equivalent to the slit 71'"+"pulse width $t_{2A}$ equivalent to the region between one slit 71' and the next slit 71'") is the period when the detection position of the transmission photo-sensor 74 is positioned on line A of the concentric circular shapes shown on FIG. 8, this being when the center 72'A of the code wheel 72' is further to the side away from the transmission photo-sensor 74 than the rotation shaft axial center 72B, $t_B$(="pulse width $t_{1B}$ equivalent to the slit 71'"+"pulse width $t_{2B}$ equivalent to the region between one slit 71' and the next slit 71'") is the period when the detection position of the transmission photo-sensor 74 is on line B of the concentric circular shapes shown on FIG. 8, this being when the center 72'A of the code wheel 72' is positioned on the rotation shaft axial center 72B, and $t_C$(="pulse width $t_{1C}$ equivalent to the slit 71'"+"pulse width $t_{2C}$ equivalent to the region between one slit 71' and the next slit 71'") is the period when the detection position of the transmission photo-sensor 74 is positioned on line C of the concentric circular shapes shown on FIG. 8, this being when the center 72'A of the code wheel 72' is on the side nearer to the transmission photo-sensor 74 than the rotation shaft axial center 72B, then the relationship "the duty ratio of the pulse signal on line A $\alpha\{=t_{1A}/(t_{1A}+t_{2A})\}$"="the duty ratio of the pulse signal on line B $\beta\{=t_{1B}/(t_{1B}+t_{2B})\}$"="the duty ratio of the pulse signal on line C $\gamma\{=t_{1C}/(t_{1C}+t_{2C})\}$" holds.

However, in the rotary encoder 52 equipped with the code wheel 72 configured as shown in FIG. 4, when the code wheel 72 rotates in the direction of the circular arc arrow shown in FIG. 4, irrespective of the rotational velocity of the code wheel 72, the duty ratio of the pulse signal generated by the transmission photo-sensor 74 changes according to the detection position of the transmission photo-sensor 74. For example, if $t_A$(="pulse width $t_{1A}$ equivalent to the slit 71"+"pulse width $t_{2A}$ equivalent to the light blocking portion 72C") is the period when the detection position of the transmission photo-sensor 74 is positioned on line A shown on FIG. 4, this being when the center 72A of the code wheel 72 is further to the side away from the transmission photo-sensor 74 than the rotation shaft axial center 72B, $t_B$(="pulse width $t_{1B}$ equivalent to the slit 71"+"pulse width $t_{2B}$ equivalent to the light blocking portion 72C") is the period when the detection position of the transmission photo-sensor 74 is on line B shown on FIG. 4, this being when the center 72A of the code wheel 72 is positioned on the rotation shaft axial center 72B, and $t_C$(="pulse width $t_{1C}$ equivalent to the slit 71"+"pulse width $t_{2C}$ equivalent to the light blocking portion 72C") is the period when the detection position of the transmission photo-sensor 74 is positioned on line C shown on FIG. 4, this being when the center 72A of the code wheel 72 is on the side nearer to the transmission photo-sensor 74 than the rotation shaft axial center 72B, then the relationship "the duty ratio of the pulse signal on line A $\alpha\{=t_{1A}/(t_{1A}+t_{2A})\}$"<"the duty ratio of the pulse signal on line B $\beta\{=t_{1B}/(t_{1B}+t_{2B})\}$"<"the duty ratio of the pulse signal on line C $\gamma\{=t_{1C}/(t_{1C}+t_{2C})\}$" holds.

When the duty ratio of the pulse signal generated by the rotary encoder equipped with the code wheel 72' is compared with the duty ratio of the pulse signal generated by the rotary encoder 52 equipped with the code wheel 72 according to the present first exemplary embodiment, in the rotary encoder equipped with the code wheel 72' no difference occurs in the duty ratio of the pulse signal according to the detection position with the transmission photo-sensor 74. However, in the rotary encoder 52 according to the present first exemplary embodiment, a difference in the duty ratio of the pulse signal occurs according to the detection position with the transmission photo-sensor 74. Namely, in the rotary encoder 52, as the detection position with the transmission photo-sensor 74 becomes closer to the center 72A side of the code wheel 72, the duty ratio of the pulse signal becomes greater.

In the image forming apparatus 10A according to the present first exemplary embodiment, the eccentricity amount of the code wheel 72 is estimated by using the pulse width whose size depends on the detection position with the transmission photo-sensor 74. Based on the estimated eccentricity amount, image forming processing is executed to form an image on the recording paper P while suppressing deformation of the image caused by image forming drum 44 eccentricity.

Figure 9:
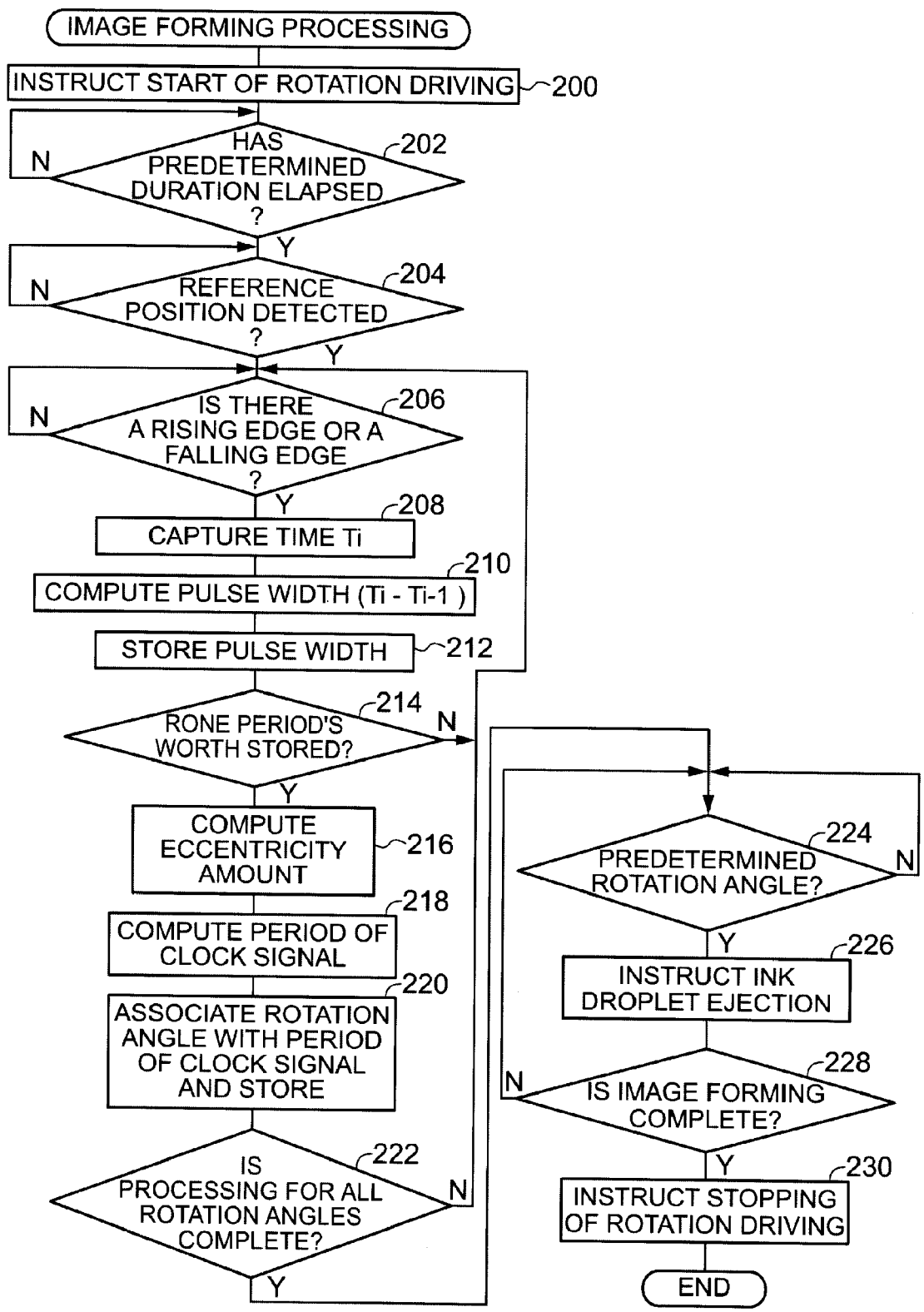
FIG. 9 is a flow chart showing the process flow of an image forming processing program according to the first exemplary embodiment.

Explanation follows of the operation of the image forming apparatus 10A when executing image forming processing, with reference to FIG. 9. FIG. 9 is a flow chart showing the flow of processing in an image forming processing program executed by the CPU 100 when input with an image forming processing execution instruction, and image data representing an image to be formed on the recording paper P, from the terminal device 114 via the communications interface 112. Note that in the image forming apparatus 10A according to the present first exemplary embodiment, the image forming processing program is stored in advance on the ROM 102, however there is no limitation thereto. For example, an embodiment may be applied in which the image forming processing program is supplied in a stored state on a computer readable recording medium, such as a CD-ROM, DVD-ROM, Universal Serial Bus (USB) memory, or the like, or an embodiment may be applied in which the image forming processing program is distributed via a communications section, by wired or wireless communication.

At step 200 of FIG. 9, a rotation start instruction signal, instructing starting rotation driving of the image forming drum 44, is output to the motor controller 118. On receipt of the rotation start instruction signal, the motor controller 118 starts driving rotation of the motor 30. The image forming drum 44 thereby receives rotation driving force from the motor 30 and starts rotating in a predetermined rotation direction. Accompanying this, the code wheel 72 also starts rotating in the predetermined rotation direction.

At the next step 202, determination is made as to whether or not a predetermined duration has elapsed from when rotation of the image forming drum 44 is started until rotation velocity has attained a predetermined rotation velocity (for example, the linear velocity is 10 mm/s at a position distanced by the rotational radius $R_0$ of the image forming drum 44 from center 72A of the code wheel 72) and become stable, and standby is maintained when this duration has not elapsed.

At the next step 204, after standing by until generation of a pulse signal corresponding to the reference slit due to detection of the reference slit of the code wheel 72, namely after standing by until the pulse signal corresponding to the reference slit is detected, the process then proceeds to step 206, and standby is maintained for detection of either the rising edge or the falling edge of the pulse signal generated by the transmission photo-sensor 74. Note that in the present step 206, when the rising edge or the falling edge of the pulse signal is detected, the value of a variable i (whose initial set value is "0"), representing the number of times of detection, is incremented by one.

When the rising edge or the falling edge of the pulse signal has been detected, after capturing the time $T_i$ of the rising edge or the falling edge of the pulse at the next step 208, the process proceeds to step 210, and the pulse width is computed of the pulse signal. The pulse width is derived by subtracting time $T_{i-1}$ from time $T_i$, and is broadly divided into the pulse width corresponding to the slit 71 (pulse width on the high level side), namely a first pulse width of the duration from the rising edge till the falling edge, and the pulse width corresponding to the region other than the slits 71 (pulse width on the low level side), namely a second pulse width of the duration from the falling edge to the rising edge. Note that "pulse width" is employed below when no distinction is made between the first pulse width and the second pulse width. In the present first exemplary embodiment, for example, the time of the rising edge or falling edge when execution of the processing of above step 204 finishes is employed as time $T_0$ of the initial rising edge or falling edge.

At the next step 212, after storing the pulse width computed at above step 210 in the RAM 104, the process proceeds to step 214, and determination is made as to whether or not the pulse widths of one pulse worth, namely the first pulse width and the second pulse width relating to a single pulse signal, have been stored in the RAM 104. When determination is negative the process returns to step 206 and detection is made for a rising edge or falling edge, however, when determination is affirmative the process proceeds to step 216. Note that in the above step 212, when the pulse widths of one pulse worth are already stored in the RAM 104, the contents stored in the RAM 104 are refreshed by overwriting with the new pulse widths of one pulse worth.

At step 216, the first pulse width and the second pulse width stored in the RAM 104 are read out, and the eccentricity amount of the code wheel 72 is computed based on the read out first pulse width and the second pulse width, and a separation distance R from the center 72A of the code wheel 72 to the center of the slits 71. Note that explanation follows of a case in the present first exemplary embodiment where the separation distance R is stored in advance in the ROM 102.

Explanation follows of the computation method of the eccentricity amount of the code wheel 72.

Figure 10:
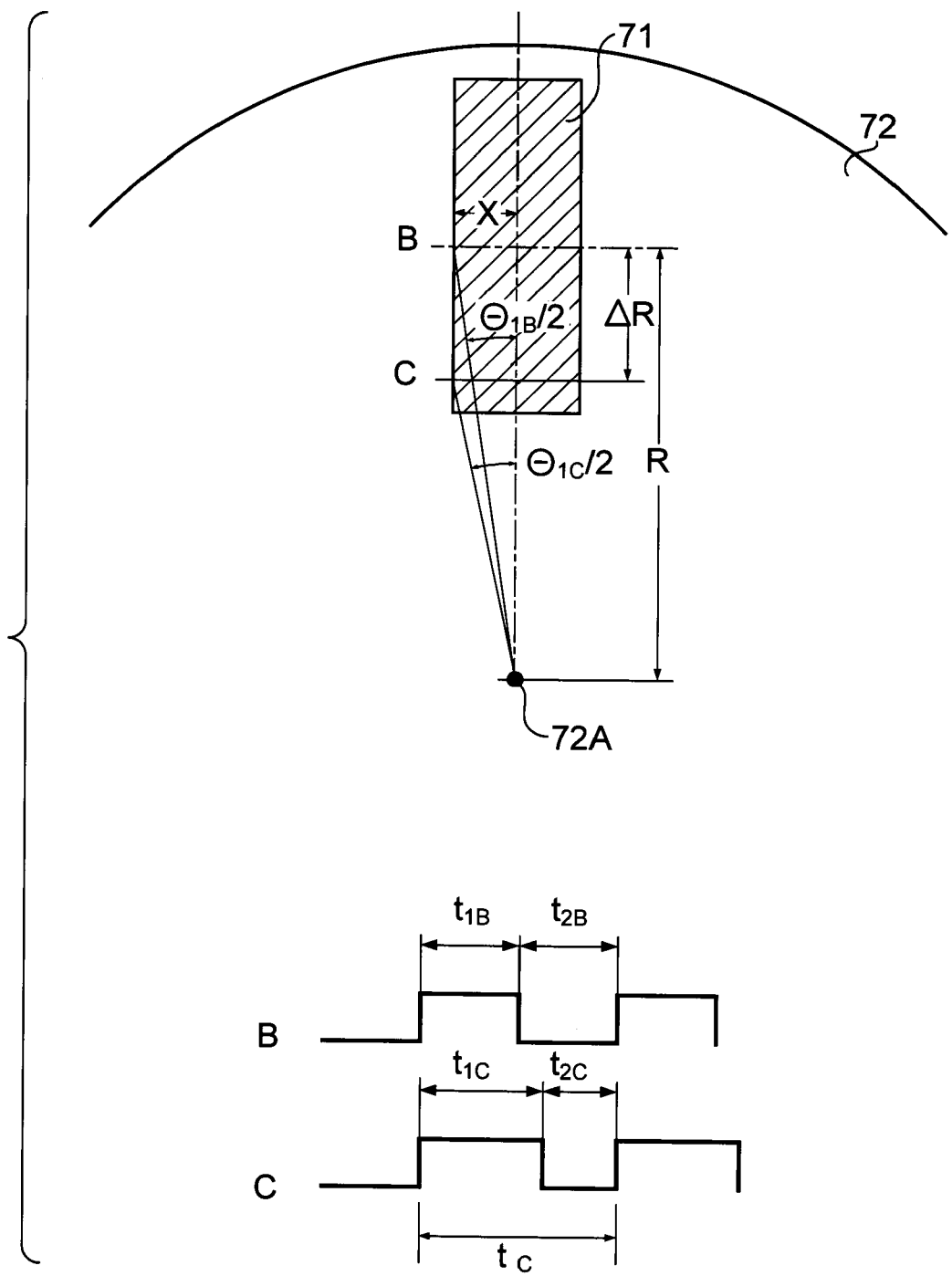
FIG. 10 is an enlarged diagram of slits formed to a code wheel included in a rotary encoder according to the first exemplary embodiment, and waveforms of pulse signals obtained by employing the code wheel.

FIG. 10 is an enlarged diagram showing the code wheel 72 with an enlargement of one of the slits 71 for detection with the transmission photo-sensor 74. As shown in FIG. 10, the first pulse width of the pulse signal generated by the transmission photo-sensor 74 is designated $t_{1B}$, and the second pulse width thereof is designated $t_{2B}$, when the detection position of the transmission photo-sensor 74 is positioned at the center of the slits 71 (above line B shown in FIG. 10) by positioning the center 72A of the code wheel 72 at the rotation shaft axial center 72B. The first pulse width of the pulse signal generated by the transmission photo-sensor 74 is designated $t_{1C}$, and the second pulse width thereof is designated $t_{2C}$, when the detection position of the transmission photo-sensor 74 faces the slit 71 at a position further to the side of the center 72A of the code wheel 72 than the center of the slits 71 (above line C in FIG. 10) by positioning the center 72A of the code wheel 72 to the side nearer to the transmission photo-sensor 74 than the rotation shaft axial center 72B. The first pulse width $t_{1B}$ is equivalent to a central angle of $\theta_{1B}$ corresponding to the region between the intersection of the line B and one of the long sides configuring a given slit 71 and the intersection of the line B with the other of the long sides configuring the slit 71. The second pulse width $t_{2B}$ is equivalent to a central angle of $\theta_{2B}$ corresponding to the region on the line B between the given slit 71 shown in FIG. 10 and the next slit 71 to the given slit 71 detected by the transmission photo-sensor 74. The first pulse width $t_{1C}$ is equivalent to a central angle of $\theta_{1C}$ corresponding to the region between the intersection of the line C and one of the long sides configuring a given slit 71 and the intersection of the line C with the other of the long sides configuring the slit 71. The second pulse width $t_{2C}$ is equivalent to a central angle of $\theta_{2C}$ corresponding to the region on the line C between the given slit 71 shown in FIG. 10 and the next slit 71 to the given slit 71 detected by the transmission photo-sensor 74. Note that the central angle $\theta_{1B}$, and the central angle $\theta_{1C}$ are sufficiently small to satisfy the following Equations (1) and (2). In Equation (1), x represents the separation distance from the center portion of the long side of the slit 71 shown in FIG. 10 up to the center of the slit 71, and $\Delta R$ in Equation (2) represents the code wheel 72 eccentricity amount.

$$\tan(\theta_{1B}/2)=\theta_{1B}/2=x/R \qquad (1)$$

$$\tan(\theta_{1C}/2)=\theta_{1C}/2=x/(R-\Delta R) \qquad (2)$$

From Equation (1) and Equation (2), the relationship between the first pulse width $t_{1B}$ and the first pulse width $t_{1C}$ is expressed by the following Equation (3). Note that the symbol "*" indicates multiply.

$$t_{1C}=t_{1B}*R/(R-\Delta R) \qquad (3)$$

As shown in FIG. 10, if the period of the pulse signal generated by the transmission photo-sensor 74 when the detection position of the transmission photo-sensor 74 is positioned on line C is equated with the period of the pulse signal generated by the transmission photo-sensor 74 when the detection position of the transmission photo-sensor 74 is on line B, the following Equation (4) is produced.

$$t_{1B}=t_{2B}=(t_{1C}+t_{2C})/2 \qquad (4)$$

The following Equation (5) is derived from Equation (3) and Equation (4).

$$\Delta R = R(t_{1C} - t_{2C})/(2t_{1C}) \quad (5)$$

Consequently, the code wheel 72 eccentricity amount ΔR is computed by substituting the first pulse width stored in the RAM 104 (equivalent to $t_{1C}$ of Equation (5)), the second pulse width stored in the RAM 104 (equivalent to $t_{2C}$ of Equation (5)), and the distance R into Equation (5).

At the next step 218, period P of the clock signal is computed based on the reference rotation angle $\Theta_0$, the rotation radius $R_0$ of the image forming drum 44, the separation distance $X_0$ between the centers of adjacent dots, the eccentricity amount ΔR computed at above step 216, the first pulse width $t_{1C}$ stored in the RAM 104, and the second pulse width $t_{2C}$ stored in the RAM 104. Explanation in the present first exemplary embodiment is of a case where the reference rotation angle $\Theta_0$, the rotation radius $R_0$ of the image forming drum 44, and the separation distance $X_0$ between the distance X0 between the centers of adjacent dots, are stored in advance on the ROM 102.

Explanation follows of a computation method of the period P of the clock signal.

The period P of the clock signal is represented by the following Equation (6). V in Equation (6) represents the linear velocity at a position separated by the rotation radius $R_0$ from the axial center of the image forming drum 44, namely, represents the peripheral velocity of the image forming drum 44.

$$P = X_0/V \quad (6)$$

The peripheral velocity V is expressed by the following Equation (7).

$$V = R_0 \Theta_0 / 2t_{1C} \quad (7)$$

Consequently, the period P of the clock signal is computed from the following Equation (8), derived from Equation (6) and Equation (7).

$$P = X_0(2t_{1C})/(R_0 \Theta_0) \quad (8)$$

In the next step 220, the rotation angle is derived from the rotation reference position of the code wheel 72, based on the current value of the variable i, and after associating the derived rotation angle with the period of the clock signal computed at step 218 and storing in the NVM 106, the process proceeds to step 222. Note that in the present first exemplary embodiment, a table is stored in advance in the ROM 102 in which values of the variable i are associated with the above rotation angles, and the above rotation angle is derived by reference to the table.

In step 222, determination is made as to whether or not the processing of above step 206 to step 220 has been completed for all predetermined rotation angles. When determination is negative the process returns to step 206 and detection is made for a rising edge or a falling edge, however when determination is affirmative the process proceeds to step 224.

At step 224, after waiting on standby until the angle of rotation from the rotation reference position of the code wheel 72 arrives at one angle of rotation out of all the above predetermined rotation angles, the process proceeds to step 226, the period P that corresponds to the current angle of rotation from the rotation reference position of the code wheel 72 is read out from the NVM 106, a clock signal of this period P is generated, synchronization is made to the generated clock signal and instruction is output to the recording head controller 116 to eject ink droplets from the nozzles 48a based on the input image data. Due thereto, since the recording head controller 116 synchronizes to the clock signal of period P, and controls the inkjet recording heads 48 so as to eject ink droplets from the nozzles 48a based on the input image data, an image expressed by the image data is formed on the recording face of the recording paper P without being affected by changes in the conveying velocity of the recording paper P.

In the next step 228, determination is made as to whether or not forming of the image expressed by the input image data is complete, and when determination is negative the process returns to step 224. However, when determination is affirmative, the process proceeds to step 230, and after a rotation stop instruction signal, instructing rotation driving of the image forming drum 44 to be stopped, is output to the motor controller 118, the present image forming processing program is ended. Note that in receipt of the rotation stop instruction signal the motor controller 118 stops rotation driving of the motor 30. Rotation driving of the image forming drum 44 is thereby stopped.

In the present first exemplary embodiment, the estimation section corresponds to the processing of step 216, and the computation section corresponds to the processing of step 218.

Second Exemplary Embodiment

Explanation follows of a second exemplary embodiment. Portions in the present second exemplary embodiment that are similar to portions of the first exemplary embodiment are allocated the same reference numerals, and explanation thereof is abbreviated.

Figure 11:
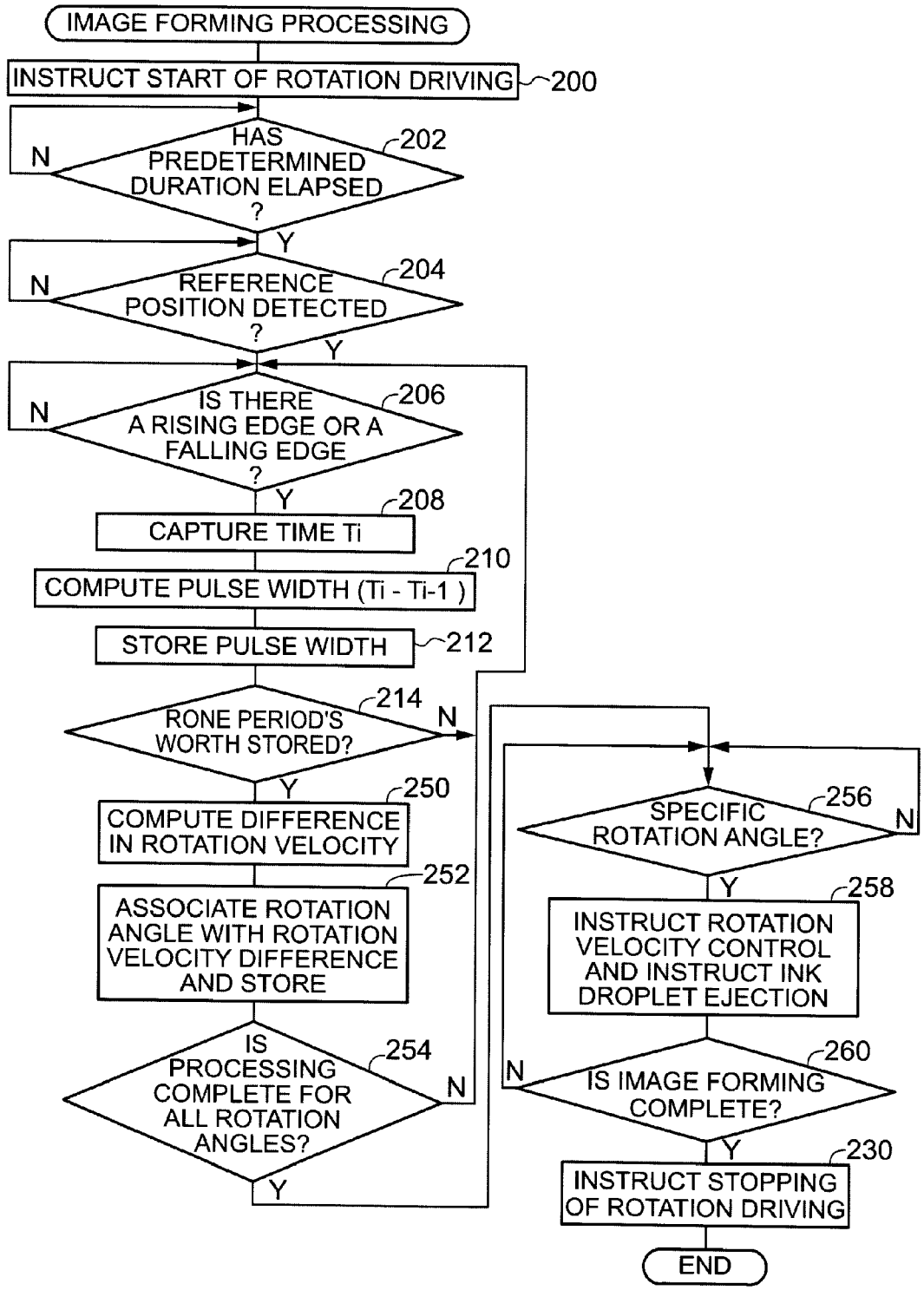
FIG. 11 is a flow chart showing process flow of an image forming processing program according to the second exemplary embodiment.

An image forming apparatus 10B of the present second exemplary embodiment (not shown in the figures) differs in comparison to the image forming apparatus 10A of the first exemplary embodiment in that processing of the flow chart shown in FIG. 11 is executed by the CPU 100, in place of the processing of the flow chart shown in FIG. 9.

Explanation follows of the operation of the image forming apparatus 10B when the image forming processing according to the present second exemplary embodiment is executed, with reference to FIG. 11. FIG. 11 is a flow chart showing the process flow of an image forming processing program executed by the CPU 100 when input with an image forming processing execution instruction and image data of the image to be formed on the recording paper P, from the terminal device 114 via the communications interface 112. Compared to the flow chart shown in FIG. 9, the flow chart shown in FIG. 11 differs in that steps 216 to 228 have been removed, and steps 250 to 260 are applied. Steps that perform similar processing in FIG. 11 to those of the flow chart shown in FIG. 9 are allocated the same step number as in FIG. 9, and explanation thereof is abbreviated. Explanation follows regarding the points that differ from the flow chart shown in FIG. 9.

At step 250 in FIG. 11, after computing, according to following Equation (9), the difference ΔV between the predetermined rotation velocity of the image forming drum 44 (for example, a peripheral velocity of the image forming drum 44 of 10 mm/s) and the actual current outer peripheral velocity of the image forming drum 44 the process proceeds to step 252. In Equation (9) the $V_0$ represents the predetermined velocity.

$$\Delta V = V - V_0 \quad (9)$$

At step 252, after associating the angle of rotation from the rotation reference position of the code wheel 72 with the difference ΔV of the outer peripheral velocity obtained by the processing of above step 250 and storing in the NVM 106, and the process proceeds to step 254. Determination is then made as to whether or not steps 206 to 214 and steps 250 and 252, have been completed for all of the predetermined rotation angles. When determination is negative the process returns to step 206, and detection is made for a rising edge or a falling edge, however when determination is affirmative the process proceeds to step 256.

At step 256, after waiting on standby until the angle of rotation from the rotation reference position of the code wheel 72 arrives at one angle of rotation out of all the above predetermined rotation angles, the process proceeds to step 258, the difference $\Delta V$ in outer peripheral velocity that corresponds to the current angle of rotation from the rotation reference position of the code wheel 72 is read out from the NVM 106. Then, with reference to the read out outer peripheral velocity difference $\Delta V$, a rotation control instruction signal is output to the motor controller 118 instructing control to be made of the rotation driving of the image forming drum 44 such that the outer peripheral velocity of the image forming drum 44 becomes the predetermined outer peripheral velocity, and also a clock signal of a predetermined period is generated, synchronization is made to the generated clock signal, and instruction is output to the recording head controller 116 to eject ink droplets from the nozzles 48a based on the input image data.

According to the processing of the above 258, in receipt of the rotation control instruction signal the motor controller 118 controls the rotation driving of the motor 30 such that the outer peripheral velocity of the image forming drum 44 becomes the predetermined outer peripheral velocity. Furthermore, according to the processing of above step 258, the recording head controller 116 synchronizes to the clock signal of the predetermined period, and controls the inkjet recording heads 48 such that ink droplets are ejected from the nozzles 48a based on the input image data. Due thereto, an image expressed by the image data is formed on the recording face of the recording paper P without being affected by changes in the conveying velocity of the recording paper P. The control section corresponds to the processing of step 258.

In the next step 260, determination is made as to whether or not forming of the image expressed by the input image data is complete, and when determination is negative the process returns to step 256, and when determination is affirmative the process proceeds to step 230.

In the present second exemplary embodiment, explanation is of an example of a case where control is made of the rotation driving of the image forming drum 44 such that the outer peripheral velocity of the image forming drum 44 becomes the predetermined outer peripheral velocity, with reference to the difference $\Delta V$ between the predetermined rotation velocity of the image forming drum 44 and the current outer peripheral velocity of the image forming drum 44. There is, however, no limitation thereto. The peripheral velocity V of the image forming drum 44 may be computed according to the following Equation (10), derived from above Equation (5) and Equation (7), and control may be made of the rotation driving of the image forming drum 44 to achieve the outer peripheral velocity V obtained by computation.

$$V=\{R_0-R(t_{1C}-t_{2C})/(2t_{1C})\}\Theta_0/(t_{1C}+t_{2C})=\Theta_0\{R_0-R(t_{1C}-t_{2C})\}/\{2t_{1C}(t_{1C}+t_{2C})\} \quad (10)$$

Third Exemplary Embodiment

Explanation follows of a third exemplary embodiment. Portions in the present third exemplary embodiment that are similar to portions of the first exemplary embodiment and the second exemplary embodiment are allocated the same reference numerals, and explanation thereof is abbreviated.

An image forming apparatus 10C of the present third exemplary embodiment (not shown in the figures) differs in comparison to the image forming apparatus 10A according to the first exemplary embodiment and the image forming apparatus 10B according to the second exemplary embodiment in that a code wheel 300 is applied in place of the code wheel 72. Therefore, explanation follows of portions of the present third exemplary embodiment that differ from those of the first and the second exemplary embodiments.

Figure 12:
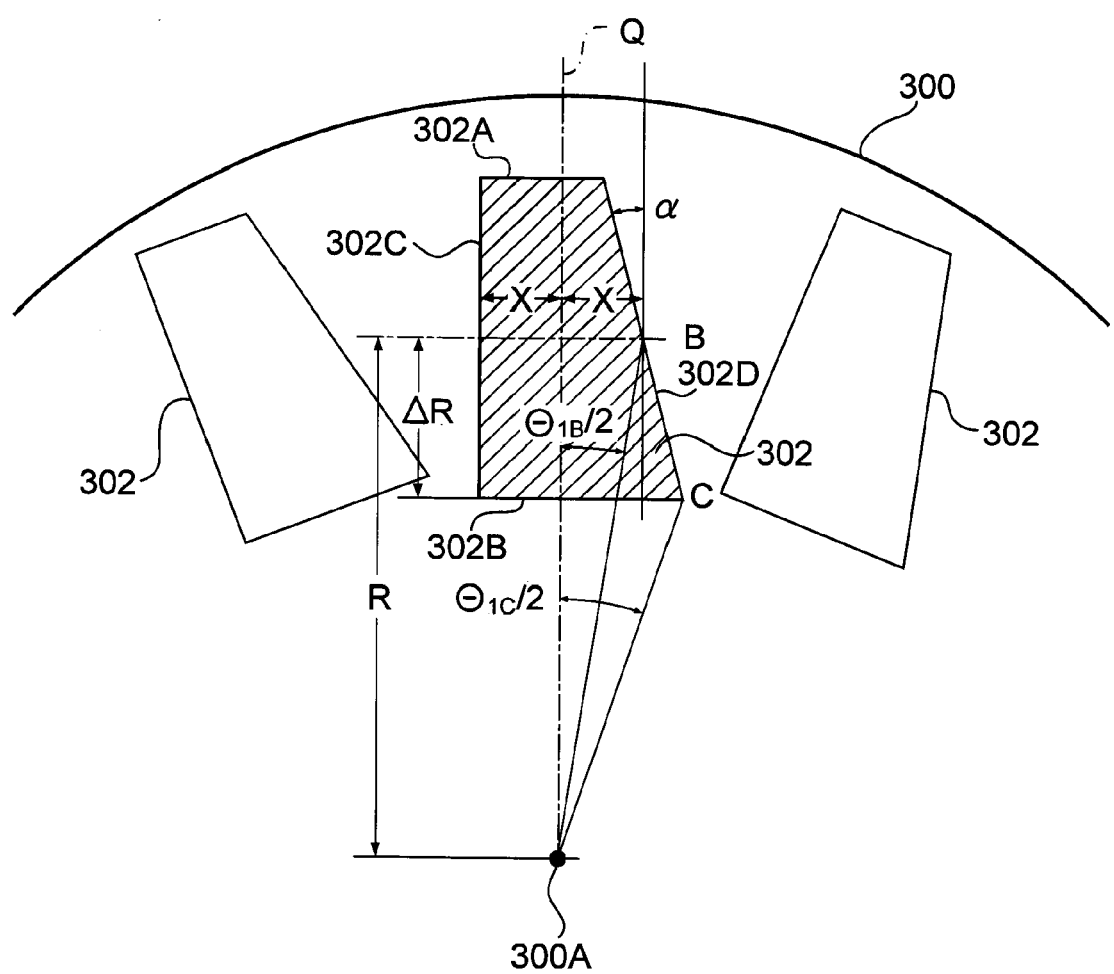
FIG. 12 is an enlarged diagram of slits formed to a code wheel included in a rotary encoder according to the third exemplary embodiment.

FIG. 12 shows a configuration of a code wheel 300 according to the present third exemplary embodiment. As shown in FIG. 12, the difference is that, in comparison to the code wheel 72 according to the first and second exemplary embodiments, slits 302 are applied to the code wheel 300 in place of the slits 71.

The slits 302 are formed in a trapezoidal shape that widens in width on progression from the outer peripheral face side of the code wheel 300 towards the center 300A side of the code wheel 300, and has two angles of substantially 90 degrees. Namely, each of the slits 302 is configured with: an upper side 302A, serving as an upper base, substantially perpendicular to a normal line Q of the code wheel 300; a lower side 302B, serving as a lower base, longer than the upper side 302A, positioned further to the center 300A side of the code wheel 300 than the upper side 302A, so as to be intersect substantially perpendicularly to the normal line Q and to face the upper side 302A; a left side 302C that is substantially parallel to the normal line Q and connects together one end of the upper side 302A and one end of the lower side 302B; and a right side 302D that connects together the other end of the upper side 302A and the other end of the lower side 302B. Note that in the present third exemplary embodiment, as shown in FIG. 12, the angle formed between a straight line through the central point on the right side 302D substantially parallel to the normal line Q, and the right side 302D, from the central point of the right side 302D to the other end of the upper side 302A, is an angle of $\alpha$ degrees.

In the present exemplary embodiment, "substantially 90 degrees" means an angle that is greater than 89 degrees, but less than 91 degrees, "substantially perpendicular" means that two straight lines intersect at an angle that is greater than 89 degrees, but less than 91 degrees, and "substantially parallel" means that two straight lines form an angle therebetween that is greater than −1 degree, but less than +1 degree.

In the above first exemplary embodiment and second exemplary embodiment, the code wheel 72 eccentricity amount $\Delta R$ is computed by above Equation (5), however in the present third exemplary embodiment, eccentricity amount $\Delta R$ of the code wheel 300 is computed by the following Equation (11). In Equation (11) $V_B$ represents the velocity (design value) of the code wheel 300 on line B.

$$\Delta R=R(t_{1C}-t_{2C})V_B/\{2(V_B*t_{1C}+R*\tan\alpha\} \quad (11)$$

Fourth Exemplary Embodiment

Explanation follows of a fourth exemplary embodiment. Portions in the present fourth exemplary embodiment that are similar to portions of the first exemplary embodiment and the second exemplary embodiment are allocated the same reference numerals, and explanation thereof is abbreviated.

An image forming apparatus 10D of the present fourth exemplary embodiment (not shown in the figures) differs in comparison to the image forming apparatus 10A according to the above first exemplary embodiment and the image forming apparatus 10B according to the above second exemplary embodiment in that a code wheel 400 is applied in place of the code wheel 72. Therefore, explanation follows of portions of the present fourth exemplary embodiment that differ from those of the first and the second exemplary embodiments.

Figure 13:
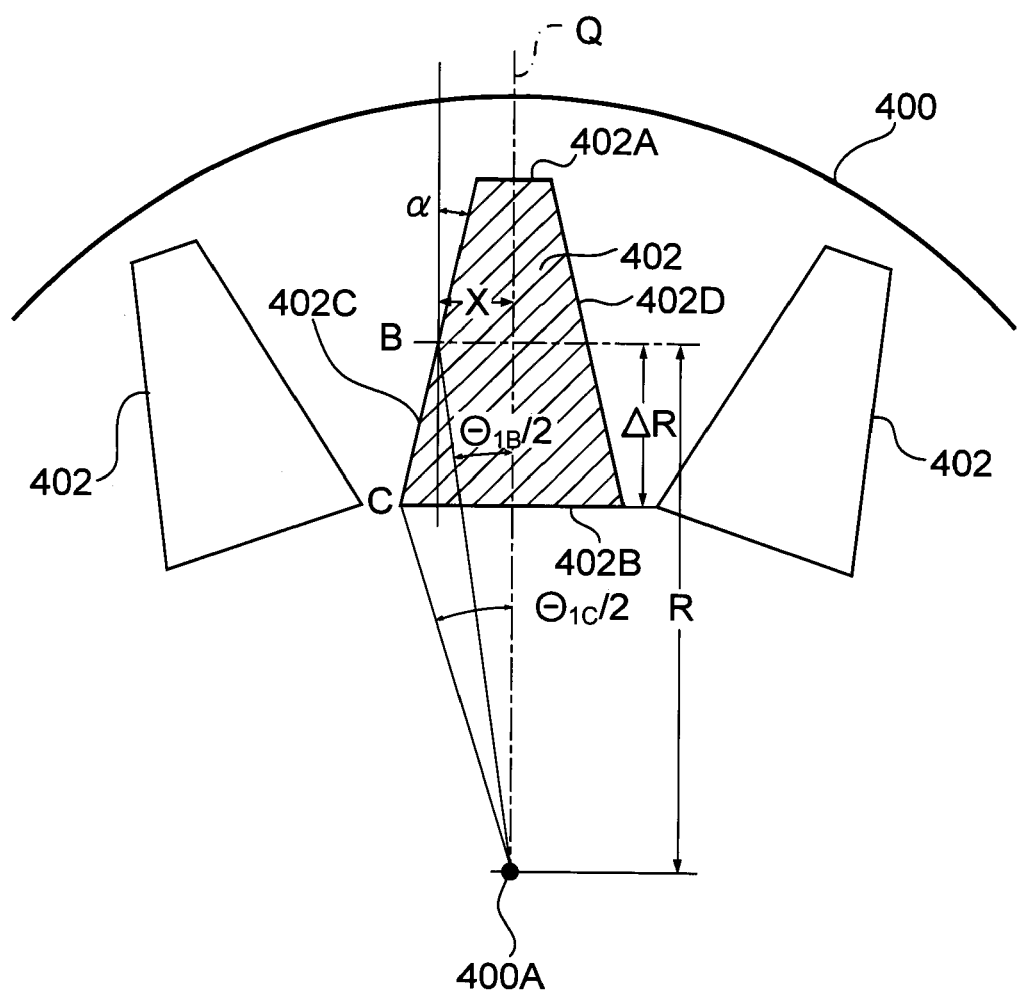
FIG. 13 is an enlarged diagram of slits formed to a code wheel included in a rotary encoder according to the fourth exemplary embodiment.

FIG. 13 shows a configuration of a code wheel 400 according to the present fourth exemplary embodiment. As shown in FIG. 13, the difference is that, in comparison to the code wheel 72 according to the first and second exemplary embodiments, slits 402 are applied to the code wheel 400 in place of the slits 71.

The slits 402 are formed of an isosceles trapezoid shape that widens in width on progression from the outer peripheral face side of the code wheel 400 towards the center 400A of the code wheel 400, so as to be formed with line-symmetry about an axis of symmetry of a normal line Q of the code wheel 400. Namely, each of the slits 402 is configured with: an upper side 402A, substantially perpendicular to the normal line Q, with the center of the upper side 402A positioned on the normal line Q; a lower side 402B that is longer than the upper side 402A, with the center of the lower side 402B positioned on the normal line Q, and the lower side 402B positioned further to the center 400A side of the code wheel 400 than the upper side 402A so as to intersect with the normal line Q substantially perpendicularly; a left side 402C that connects together one end of the upper side 402A and one end of the lower side 402B; and a right side 402D that connects together the other end of the upper side 402A and the other end of the lower side 402B. Note that in the present fourth exemplary embodiment, as shown in FIG. 13, the angle formed between a straight line substantially parallel to the normal line Q at a central point on the left side 402C and the left side 402C, from the central point of the left side 402C to the other end of the upper side 402A, is an angle of α degrees.

In the above first exemplary embodiment and second exemplary embodiment, the code wheel 72 eccentricity amount ΔR is computed by above Equation (5), however in the present fourth exemplary embodiment, the code wheel 400 eccentricity amount ΔR is computed by the following Equation (12). In Equation (12) $V_B$ represents the velocity (design value) of the code wheel 400 on line B.

$$\Delta R = R(t_{1C} - t_{2C})V_B / \{2(V_B * t_{1C} + R * \tan \alpha\} \quad (12)$$

Fifth Exemplary Embodiment

Explanation follows of a fifth exemplary embodiment. Portions in the present fifth exemplary embodiment that are similar to portions of the first to the fourth exemplary embodiments are allocated the same reference numerals, and explanation thereof is abbreviated.

Figure 14:
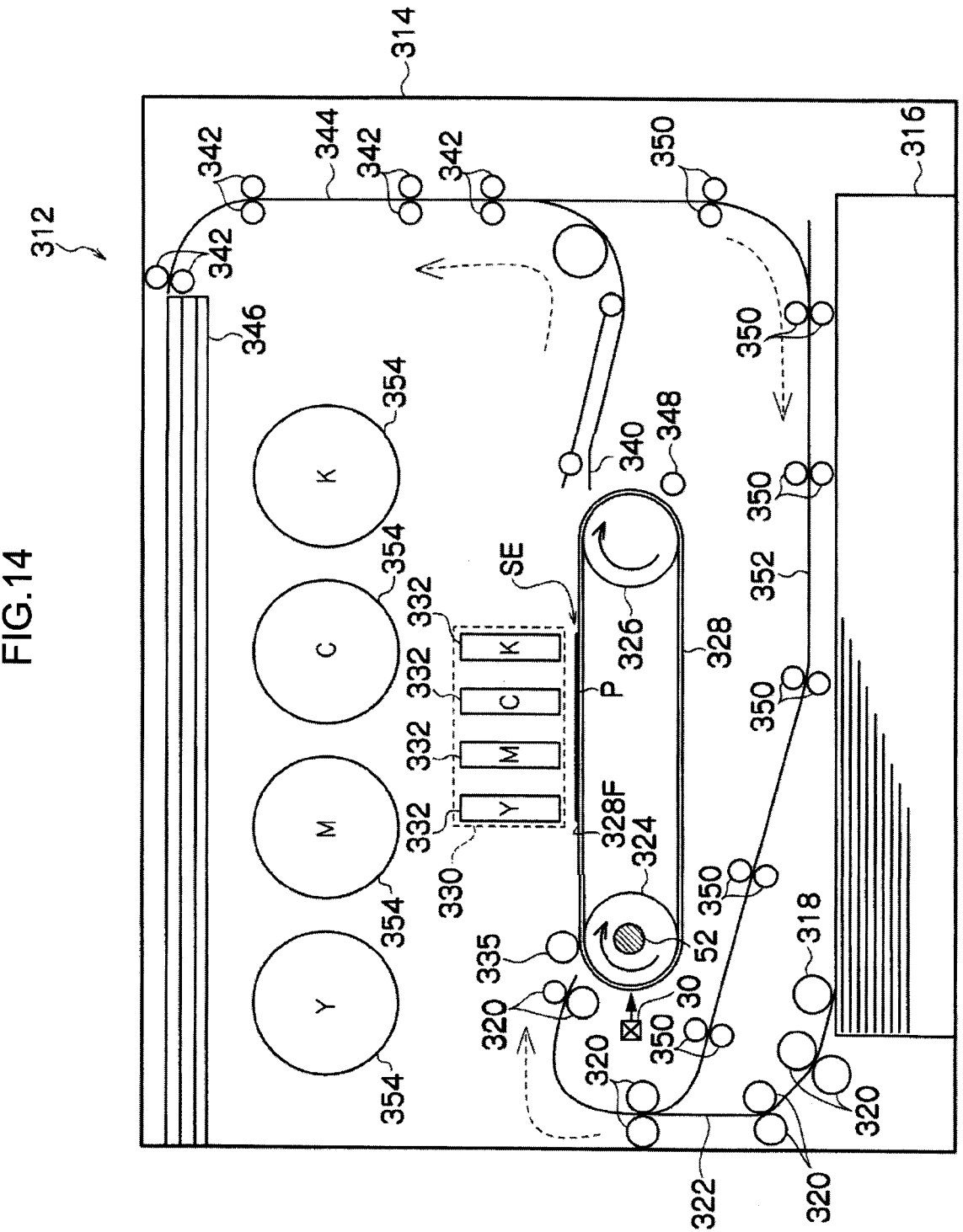
FIG. 14 is a side view showing a configuration of an image forming apparatus according to a fifth exemplary embodiment.

FIG. 14 is a side view showing a configuration of an image forming apparatus 312 according to the present fifth exemplary embodiment.

As shown in FIG. 14, the image forming apparatus 312 is equipped with a paper supply box 316 in bottom portion of a casing 314 of the image forming apparatus 312, and recording paper P that is stacked in the paper supply box 316 is taken out one sheet at a time by a pick-up roller 318. The recording paper P that has been taken out is conveyed by plural pairs of conveying rollers 320 configuring a predetermined conveying path 322. When reference is made below simply to "conveying direction", this refers to the conveying direction of the recording paper P, and "upstream" and "downstream" refer to the upstream and downstream of the conveying direction, respectively.

A conveyor belt 328 is disposed as an image conveying section above the paper supply box 316. The conveyor belt 328 is an endless shape, entrained around a drive roller 324 and a driven roller 326. Note that the conveyor belt 328 also functions as a conveying body that conveys the recording paper P so that the recording face thereof faces nozzles 48a of inkjet recording heads 332, and the conveyor belt 328 corresponds to the image forming drum 44 in each of the exemplary embodiments explained above.

The drive roller 324 receives driving force of a motor 30 and rotates. The drive roller 324 is equipped with a rotary encoder 52 configured by the code wheel 72 of the above first exemplary embodiment. Note that the rotary encoder 52 of the present fifth exemplary embodiment generates a pulse signal for detecting a predetermined rotation reference position of the driven roller 326 accompanying the rotation of the drive roller 324, and also generates a pulse signal for detecting the angle of rotation from the reference position of the drive roller 324.

A recording head array 330 is disposed above the conveyor belt 328, facing a flat portion 328F of the conveyor belt 328. This facing region is an ejection region SE where ink droplets are ejected from the recording head array 330. The recording paper P conveyed on the conveying path 322 is retained on the conveyor belt 328 and arrives at the ejection region SE, then ink droplets are applied, according to image data, from the recording head array 330 onto the recording paper P, in a state facing the recording head array 330.

The recording head array 330 in the present fifth exemplary embodiment includes four of the inkjet recording heads 332 of an elongated shape having an effective recording region that is as long as the width of the recording paper P or longer, disposed along the conveying direction. The inkjet recording heads 332 correspond to each of four colors, Y, M, C, and K so as to form color images. Each of the inkjet recording heads 332 is of a similar configuration to that of the inkjet recording heads 48 explained in the first exemplary embodiment, and has nozzles 48a similar to the inkjet recording heads 48. Operation of each of the inkjet recording heads 332 is controlled by a recording head controller 116 as explained in the first exemplary embodiment.

A charging roller 335 is disposed at the upstream side of the reading head array 330, and a power source (not shown in the figures) is connected to the charging roller 335. The charging roller 335 follows the drive roller 324, while nipping the conveyor belt 328 and the recording paper P between the charging roller 335 and the drive roller 324, moving the recording paper P between a pressing position where the recording paper P is pressed against the conveyor belt 328 and a separation position where the recording paper P is separated from the conveyor belt 328. Charge is imparted to the recording paper P at the pressing position, and the recording paper P is electrostatically attracted onto the conveyor belt 328.

A release blade 340 is disposed further to the downstream side than the recording head array 330, formed, for example, from an aluminum blade, and the recording paper P is thereby released from the conveyor belt 328. The released recording paper P is conveyed by plural discharge roller pairs 342 configuring a discharge path 344 at the downstream side of the release blade 340, and the recording paper P is discharged to a discharge paper tray 346 provided at a top portion of the casing 314.

A cleaning roller 348 is disposed below the release blade 340, with the conveyor belt 328 disposed between the cleaning roller 348 and the driven roller 326, and the surface of the conveyor belt 328 is cleaned by the cleaning roller 348.

A reversing path 352 configured from plural reversing roller pairs 350 is provided between the paper supply box 316 and the conveyor belt 328, such that image recording is readily performed to both sides of the recording paper P, by reversing recording paper P that has an image recorded on one side thereof and retaining it back on the conveyor belt 328.

Ink tanks 354, storing ink of each of the four colors, are provided between the conveyor belt 328 and the discharge paper tray 346. The ink from the ink tanks 354 is supplied to the recording head array 330 by ink feed tubes (not shown in the figures).

Figure 15:
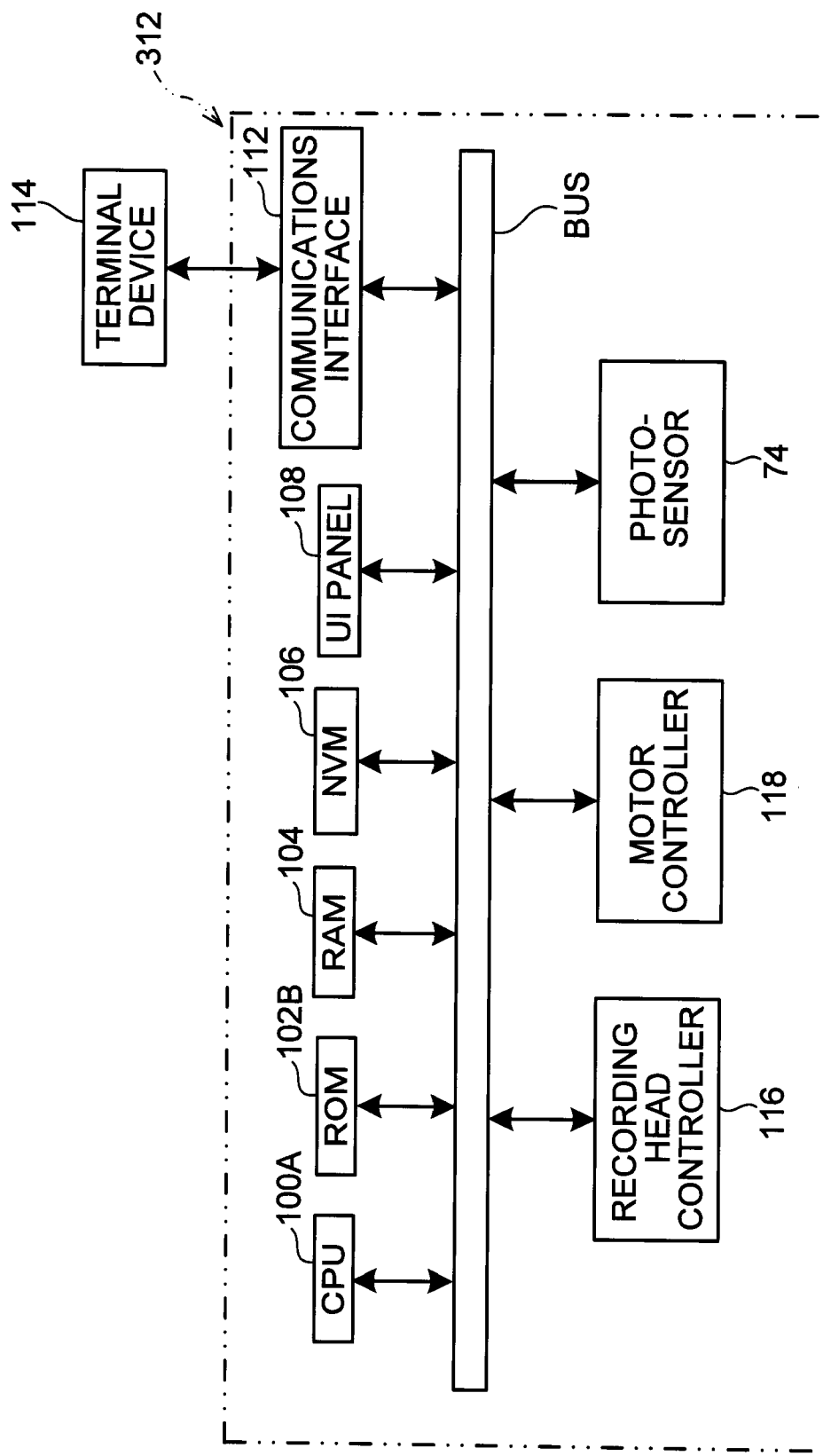
FIG. 15 is a block diagram showing relevant parts of a configuration of an electrical system of an image forming apparatus according to the fifth exemplary embodiment.

FIG. 15 is a block diagram showing a relevant portions of a configuration of an electrical system of the image forming apparatus 312 according to the present fifth exemplary embodiment. In the following, similar configuration elements to those of FIG. 5 are allocated the same reference numerals, and explanation thereof is abbreviated.

The image forming apparatus 312 differs in comparison to the image forming apparatus 10A of the above first exemplary embodiment in that a CPU 100A is employed in place of the CPU 100, and a ROM 102B is employed in place of the ROM 102. The CPU 100A controls the operation of the image forming apparatus 312 overall. The ROM 102A, differs in comparison with the ROM 102 in that it is stored with a control program that controls the operation of the image forming apparatus 312, in place of the control program that controls the operation of the image forming apparatus 10A, and is stored with a rotation radius $R_0$ that corresponds to the distance between the surface of the conveyor belt 328, on the outer peripheral face of the drive roller 324, and the axial center of the drive roller 324, in place of the rotation radius $R_0$ of the image forming drum 44.

Explanation follows of the operation of the image forming apparatus 312 according to the present fifth exemplary embodiment.

In the image forming apparatus 312 according to the present fifth exemplary embodiment, the recording paper P taken out from the paper supply box 316 is conveyed and arrives at the conveyor belt 328. The recording paper P is then pressed against the conveyor belt 328 by the charging roller 335, and retained attracted to the conveyor belt 328 by application of voltage from the charging roller 335. Ink droplets are ejected from the recording head array 330 in this state, while the recording paper P is gradually passing the ejection region SE due to the circulation of the conveyor belt, forming an image on the recording paper P.

However, the conveying velocity of the recording paper P retained on the surface of the conveyor belt 328 fluctuates, for example due to eccentricity of the drive roller 324. In this state, with the conveying velocity of the recording paper P on the conveyor belt 328 fluctuating, if a clock signal for synchronizing to the pulse signal generated by the rotary encoder 52 were to be output to the inkjet recording heads 332, synchronized to the clock signal, and ink droplets ejected from the nozzles 48a of the inkjet recording heads 332, then the image formed by the ink droplets would be distorted.

In the image forming apparatus 312 according to the present fifth exemplary embodiment, image forming processing is executed for forming an image on the recording paper P, while suppressing distortion of the image due to the drive roller 324 eccentricity.

In the present fifth exemplary embodiment, the processing of the flow chart shown in FIG. 9 is executed by the CPU 100A when an instruction to execute image forming processing and image data expressing the image to be formed on the recording paper P are input from the terminal device 114 via the communications interface 112, however there is no limitation thereto, and the processing of the flow chart shown in FIG. 11 may be executed.

Figure 16:
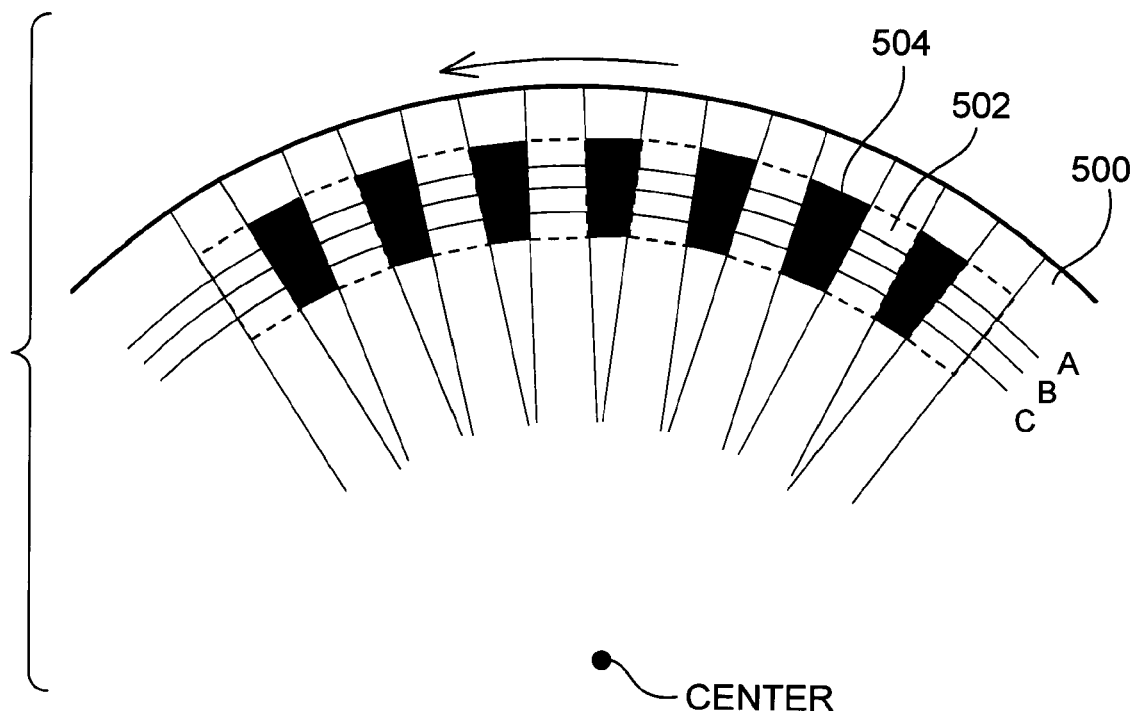
FIG. 16 is a diagram showing another example of an embodiment of a code wheel.

Note that in the above first exemplary embodiment, explanation is of the code wheel 72 to which the light blocking portion 72C is formed in an isosceles trapezoid shape in the region between one of the slits 71 and the next of slits 71 formed around the whole of the circumference. However, there is no limitation thereto, and a code wheel may be employed with the light transmitting portions and the light blocking portions reversed, with plural individual slits formed at a predetermined spacing around the entire circumference, having the shorter of the base sides positioned at the center side and the longer of the base sides positioned at the outer peripheral side, with light blocking portions of rectangular shape disposed in the regions between one slit and the next slit. For example, configuration may be made as the code wheel 500 equipped with slits 504, as shown in FIG. 16. The code wheel 500 shown in FIG. 16 differs in comparison with the code wheel 72 explained in the above first exemplary embodiment in that the light blocking portions 502 are employed to block light emitted from the light emitting element of the transmission photo-sensor 74, and in place of the slits 71, and the slits 504 are employed in place of the regions between one of the slits 71 and the next of the slits 71. Furthermore, in place of the code wheel 300 explained in the above third exemplary embodiment, a code wheel may be employed in which the slits 302 of the code wheel 300 are filled in, and the regions between the adjacent slits 302 of the code wheel 300 are made into slits. Furthermore, in place of the code wheel 400 explained in the above fourth exemplary embodiment, a code wheel may be employed in which the slits 402 of the code wheel 400 are filled in, and the regions between the adjacent slits 402 of the code wheel 400 are made into slits. A code wheel may be employed equipped in this manner with plural non-detected portions disposed at a predetermined rotation angle spacing along the rotation direction, with each formed such that from the outer peripherals ends thereof along to the inner peripheral ends thereof, the width at locations at the inner peripheral side is equal to, or greater than, the width at locations to the outer peripheral side (for example the light blocking portions 502 shown in FIG. 16), and the detected portions are each formed between the non-detected portions (for example the slits 504 shown in FIG. 16).

Furthermore, in each of the above exemplary embodiments, the separation distance R is taken as the separation distance from the center of the slit 71 to the center 72A of the code wheel 72, however there is no limitation thereto. For example, the separation distance may be taken from the point of the slit 71 that is on the center 72A side of the line B on the normal line Q and also at the outer peripheral side of line C, up to the center 72A of the code wheel 72. The separation distance may also be taken from the point of the slit 71 that is nearer than line B on the normal line Q to the transmission photo-sensor 74 up to the center 72A of the code wheel 72. The separation distance simply needs to be from the center of the code wheel 72 up to a predetermined position on the slit 71, as in the above.

Furthermore, in each of the above exemplary embodiments, the outer peripheral velocity V of the image forming drum 44 is computed according to Equation (7) above, however there is no limitation thereto, and the angular velocity ω of the image forming drum 44 may be computed according to the following Equation (13).

$$\omega = \{R_0/(R_0 - \Delta R)\} * \{\Theta_0/(t_{1C})\} \quad (13)$$

Furthermore, in the above first, second and fifth exemplary embodiments, the shape of the slits formed on the code wheel is rectangular, in the above third exemplary embodiment the shape of the slits formed on the code wheel is a trapezoidal shape having two substantially 90 degree angles, in the above fourth exemplary embodiment the shape of the slits formed on the code wheel is an isosceles trapezoid shape, however the shape of the slits is not limited thereto. For example, a triangular shape may be employed with a base side positioned at the center side. Polygonal shapes other than triangles and quadrangles may also be employed. Furthermore, one or more portions of the sides configuring the slit may be curved. Furthermore, one or more portions of the sides configuring the slit may have an inflection. In such a manner, the shape of the slits may be one or other shape formed such that from the code wheel outer peripheral end portion of the slit along to the code wheel inner peripheral end portion of the slit, the width at locations at the inner peripheral side is equal to, or greater than, the width at locations to the outer peripheral side.

In each of the above exemplary embodiments, the rotation radius $R_0$ does not change, however there is no limitation thereto, and, for example, the rotation radius $R_0$ may be variable. Such cases, include, for example, an embodiment in which the rotation radius $R_0$ is changed according to the thickness of the recording paper P on which the image is formed.

Furthermore, in each of the above exemplary embodiments, explanation is of exemplary embodiments in which estimation is made by computation of the code wheel 72 eccentricity amount $\Delta R$ employing a computation equation, however there is no limitation thereto. The first pulse width, the second pulse width, and the separation distance R may be input, a table for outputting the eccentricity amount $\Delta R$ may be stored in advance on a storage medium, such as the ROM 102, 102A or the like, and estimation made by deriving the eccentricity amount $\Delta R$ from the table. Regarding the period P of the clock signal too, the reference rotation angle $\Theta_0$, the rotation radius $R_0$ of the image forming drum 44, the distance $X_0$ between the center of adjacent dots, the eccentricity amount $\Delta R$, the first pulse width, and the second pulse width may be input, a table for outputting the period P of the clock signal may be stored in advance on a storage medium, such as the ROM 102, 102A or the like, and the period P of the clock signal derived by employing the table. Regarding the outer peripheral velocity V of the image forming drum 44 or the difference $\Delta V$, the eccentricity amount $\Delta R$, the reference rotation angle $\Theta_0$, the rotation radius $R_0$ of the image forming drum 44, the first pulse width, and the second pulse width may be input, a table for outputting the outer peripheral velocity V or the difference $\Delta V$ may be stored in advance in a storage medium, such as the ROM 102, 102A or the like, and the outer peripheral velocity V or the difference $\Delta V$ derived by employing the table.

Furthermore, in each of the above exemplary embodiments, explanation is given of examples of an image forming apparatus of embodiments in which an image is directly formed on the recording paper P by the inkjet recording heads, however there is no limitation thereto. Image forming apparatuses may be of embodiments in which an image is formed on the recording paper P via an intermediate transfer body. Examples of embodiments in such cases include, for example, an image forming apparatus in which a latent image is formed on the outer peripheral surface (predetermined face) of a photoreceptor drum, this being a rotating body, using a recording head equipped with light emitting elements, for example Light Emitting Diodes (LED's) or the like, a toner image of the latent image is made, and then the toner image is transferred onto the recording face (surface) of recording paper.

Furthermore, in the above exemplary embodiments, the transmission photo-sensor 74 detects fluctuations in the amount of light, so as to generate a pulse signal according to the detected fluctuations in the amount of light, however there is no limitation thereto. For example, in place of the slits 71 (302, 402), reflection plates with a higher light reflectivity than that other regions of the code wheel 72 (300, 400) may be provided. A reflection photo-sensor, configured with a light emitting element and a light receiving element that receives the light emitted from the light emitting element and reflected by the reflection plates, may be employed in place of the transmission photo-sensor 74, and fluctuations in the amount of light detected with the refection photo-sensor and a pulse signal generated. Furthermore, magnets may be provided in place of the slits 71 (302, 402), a magnetic sensor employed in place of a photo-sensor, fluctuations in magnetism detected by the magnetic sensor and a pulse signal generated.

In this manner, the rotary encoder 52 may be configured with: plural detected portions disposed substantially evenly spaced around the circumferential direction of the code wheel 72, such that a predetermined difference or greater occurs in the size of a given physical characteristic between the detected portions and other regions of the code wheel 72; and a pulse signal generation section that, accompanying rotation of the code wheel 72, detects the size of the difference in the given physical characteristic between the plural detected portions and the regions of the code wheel 72 other than the detected portions, and generates a pulse signal according to the detected difference.

Furthermore, in each of the above exemplary embodiments, the inkjet recording heads 48, 332 have a structure in which the plural nozzles 48a are arranged in two rows such that the nozzles 48a do not overlap along the slow scanning direction, however there is no limitation thereto. The inkjet recording head 48, 332 may have any structure in which the nozzles 48a are disposed in two dimensions so as not to overlap along the slow scanning direction.

Furthermore, in each of the above exemplary embodiments, examples of embodiments have been explained for cases in which the eccentricity amount estimation device is applied to an image forming apparatus, however there is no limitation thereto. The eccentricity amount estimation device explained in the above exemplary embodiments may also be applied to applications other than in recording paper, for example in: a rotary encoder for attaching to a roller that conveys a transparent substrate, such as acrylic glass, a plastic substrate, a plastic film or the like that forms a base of a color filter employed in a color liquid crystal display or organic EL display; and a rotary encoder for provision on a disk rotation shaft, such as, for example, in an optical disk device.

What is claimed is:
1. An eccentricity amount estimation device comprising:
a rotation body provided with a plurality of detected portions disposed along the rotation direction at predetermined rotation angle intervals, each of the plurality of detected portions being formed such that from an outer peripheral end towards an inner peripheral end a width of the detected portion at a position at the peripheral inside is wider than the width at a position at the peripheral outside;
a generating section that generates a pulse signal according to passing of each of the plurality of detected portions accompanying rotation of the rotation body; and an estimation section that estimates a physical quantity corresponding to an eccentricity amount of the rotation body, based on a high level side pulse width and a low level side pulse width within one period the pulse signal generated by the generating section.

2. The eccentricity amount estimation device of claim 1, wherein the estimation section estimates the eccentricity amount of the rotation body based on the high level side pulse width, the low level side pulse width, and a distance from the center of the rotation body to a predetermined position of the detected portion.

3. The eccentricity amount estimation device of claim 1, wherein each of the detected portions is formed in a trapezoidal shape with an upper base positioned at the outer peripheral side of the rotation body and a lower base positioned at the inner peripheral side of the rotation body.

4. A rotation velocity control device comprising:
the eccentricity amount estimation device of claim 1; and
a control section that controls rotation of the rotation body such that a velocity related to rotation of the rotation body becomes a predetermined velocity, based on the estimation result of the estimation section.

5. An image forming apparatus comprising:
the eccentricity amount estimation device of claim 1;
a recording head comprising a plurality of image forming elements that form respective configuration units configuring images on a predetermined surface in synchronization with a clock signal;
an image conveying section that conveys an image by functioning as either a transfer body that rotates in synchronization with rotational operation of the rotation body and transfers an image formed on the peripheral face of the transfer body by the image forming elements onto a surface of the recording medium, or a conveying body that rotates in synchronization with the rotational operation of the rotation body and conveys the recording medium such that a surface of the recording medium and the image forming elements face each other, while the recording medium is in a retained state on the peripheral face of the conveying body; and
a derivation section that derives a periodicity of the clock signal based on a high level side pulse width and a low level side pulse width within one period of the pulse signal generated by the generating section, the estimation result of the estimation section, a reference rotation angle of the rotation body, a predetermined rotation radius, and a distance between centers of adjacent configuration units.

6. A rotation velocity control device comprising:
a rotation body provided with a plurality of detected portions disposed along the rotation direction at predetermined rotation angle intervals, each of the plurality of detected portions being formed such that from an outer peripheral end towards an inner peripheral end a width of the detected portion at a position at the peripheral inside is wider than the width at a position at the peripheral outside;
a generating section that generates a pulse signal according to passing of each of the plurality of detected portions accompanying rotation of the rotation body; and
a control section that controls rotation of the rotation body such that a velocity related to rotation of the rotation body becomes a predetermined velocity, based on a high level side pulse width and a low level side pulse width within one period of the pulse signal generated by the generating section, a reference rotation angle of the rotation body, a distance from the center of the rotation body to a predetermined position of the detected portion, and a predetermined rotation radius.

7. An image forming apparatus comprising:
the rotation velocity control device of claim 6;
a recording head comprising a plurality of image forming elements that form respective configuration units configuring images on a predetermined surface; and
an image conveying section that conveys an image by functioning as either a transfer body that rotates in synchronization with rotational operation of the rotation body and transfers an image formed on the peripheral face of the transfer body by the image forming elements onto a surface of the recording medium, or a conveying body that rotates in synchronization with the rotational operation of the rotation body and conveys the recording medium such that a surface of the recording medium and the image forming elements face each other, while the recording medium is in a retained state on the peripheral face of the conveying body.

8. A non-transitory computer readable storage medium stored with a computer program, the computer program causing a computer to function as an estimation section that estimates a physical quantity corresponding to an eccentricity amount of a rotation body, based on a high level side pulse width and a low level side pulse width within one period of a pulse signal generated by a generating section, the generating section generating a pulse signal according to passing of each of a plurality of detected portions provided on the rotation body accompanying rotation of the rotation body, the plurality of detected portions being disposed along the rotation direction at predetermined rotation angle intervals on the rotation body, each of the plurality of detected portions being formed such that from an outer peripheral end towards an inner peripheral end a width of the detected portion at a position at the peripheral inside is wider than the width at a position at the peripheral outside.

9. A non-transitory computer readable storage medium stored with a computer program, the computer program causing a computer to function as a control section that controls rotation of a rotation body such that a velocity related to rotation of the rotation body becomes a predetermined velocity, based on a reference rotation angle of the rotation body, a distance from the center of the rotation body to a predetermined position on a plurality of detected portions provided on the rotation body, a predetermined rotation radius, and a high level side pulse width and a low level side pulse width within one period of a pulse signal generated by a generating section, the generating section generating a pulse signal according to passing of each of the plurality of detected portions accompanying rotation of the rotation body, each of the plurality of detected portions being disposed along the rotation direction at predetermined rotation angle intervals on the rotation body, each of the plurality of detected portions being formed such that from an outer peripheral end towards an inner peripheral end a width of the detected portion at a position at the peripheral inside is wider than the width at a position at the peripheral outside.

* * * * *